United States Patent
Yamada et al.

(10) Patent No.: US 10,060,834 B2
(45) Date of Patent: Aug. 28, 2018

(54) FAILURE PREDICTION APPARATUS AND FAILURE PREDICTION SYSTEM

(71) Applicant: FUJI XEROX CO., LTD., Tokyo (JP)

(72) Inventors: Norikazu Yamada, Kanagawa (JP); Takashi Kusakai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 484 days.

(21) Appl. No.: 14/703,093

(22) Filed: May 4, 2015

(65) Prior Publication Data

US 2016/0116375 A1    Apr. 28, 2016

(30) Foreign Application Priority Data

Oct. 24, 2014 (JP) .................................. 2014-217672

(51) Int. Cl.
G01M 99/00 (2011.01)
G03G 15/00 (2006.01)

(52) U.S. Cl.
CPC ...... *G01M 99/005* (2013.01); *G03G 15/5079* (2013.01); *G03G 15/55* (2013.01)

(58) Field of Classification Search
CPC combination set(s) only.
See application file for complete search history.

(56) References Cited

U.S. PATENT DOCUMENTS

| | | | |
|---|---|---|---|
| 2009/0319827 A1 | 12/2009 | Nakazato et al. | |
| 2012/0075659 A1* | 3/2012 | Sawada | G03G 15/5058 358/1.14 |
| 2012/0226948 A1* | 9/2012 | Itogawa | G06F 11/008 714/47.3 |
| 2013/0253898 A1* | 9/2013 | Meagher | G06F 17/5009 703/18 |
| 2014/0207520 A1* | 7/2014 | Mitsuhashi | G06Q 30/0202 705/7.31 |
| 2015/0047377 A1* | 2/2015 | Hamasaki | F25B 9/145 62/115 |

(Continued)

FOREIGN PATENT DOCUMENTS

| | | |
|---|---|---|
| JP | 2010-002815 A | 1/2010 |
| JP | 2011-237576 A | 11/2011 |

(Continued)

*Primary Examiner* — Mamadou Diallo
(74) *Attorney, Agent, or Firm* — Oliff PLC

(57) ABSTRACT

A failure prediction apparatus includes a state feature amount acquisition unit that acquires plural state feature amounts indicating features of an operating state of an apparatus to be monitored, a statistic acquisition unit that acquires statistics of an environmental physical amount indicating an installation environment of the apparatus to be monitored for a specific period, and a calculation unit that acquires a selection condition corresponding to the statistics acquired by the statistic acquisition unit among plural selection conditions, and calculates probability of a failure occurring in the apparatus to be monitored, using the state feature amount satisfying the acquired selection condition, wherein the plural selection conditions are predetermined for each category of the statistics, and are conditions for selecting each of the state feature amounts required to calculate the probability of the failure occurring in the apparatus to be monitored.

16 Claims, 17 Drawing Sheets

(56) References Cited

U.S. PATENT DOCUMENTS

| | | | |
|---|---|---|---|
| 2015/0132017 A1* | 5/2015 | Imazeki | G03G 15/55 399/24 |
| 2015/0281015 A1* | 10/2015 | Griffith | H04L 43/0817 709/224 |
| 2015/0377745 A1* | 12/2015 | Al-Najjar | G05B 23/024 702/183 |
| 2016/0026517 A1* | 1/2016 | Bickford | G06F 11/008 714/47.3 |
| 2016/0076976 A1* | 3/2016 | Patrick | G01M 99/005 702/34 |
| 2016/0098234 A1* | 4/2016 | Weaver | G06F 3/1234 358/1.15 |
| 2016/0116377 A1* | 4/2016 | Uwatoko | G06K 9/627 702/181 |
| 2017/0117841 A1* | 4/2017 | Watanabe | H02P 29/68 |
| 2017/0153644 A1* | 6/2017 | Otsuka | G05D 1/0214 |
| 2017/0228653 A1* | 8/2017 | Meagher | G06N 5/04 |

FOREIGN PATENT DOCUMENTS

| | | |
|---|---|---|
| JP | 2012-037991 A | 2/2012 |
| JP | 2012-073923 A | 4/2012 |

\* cited by examiner

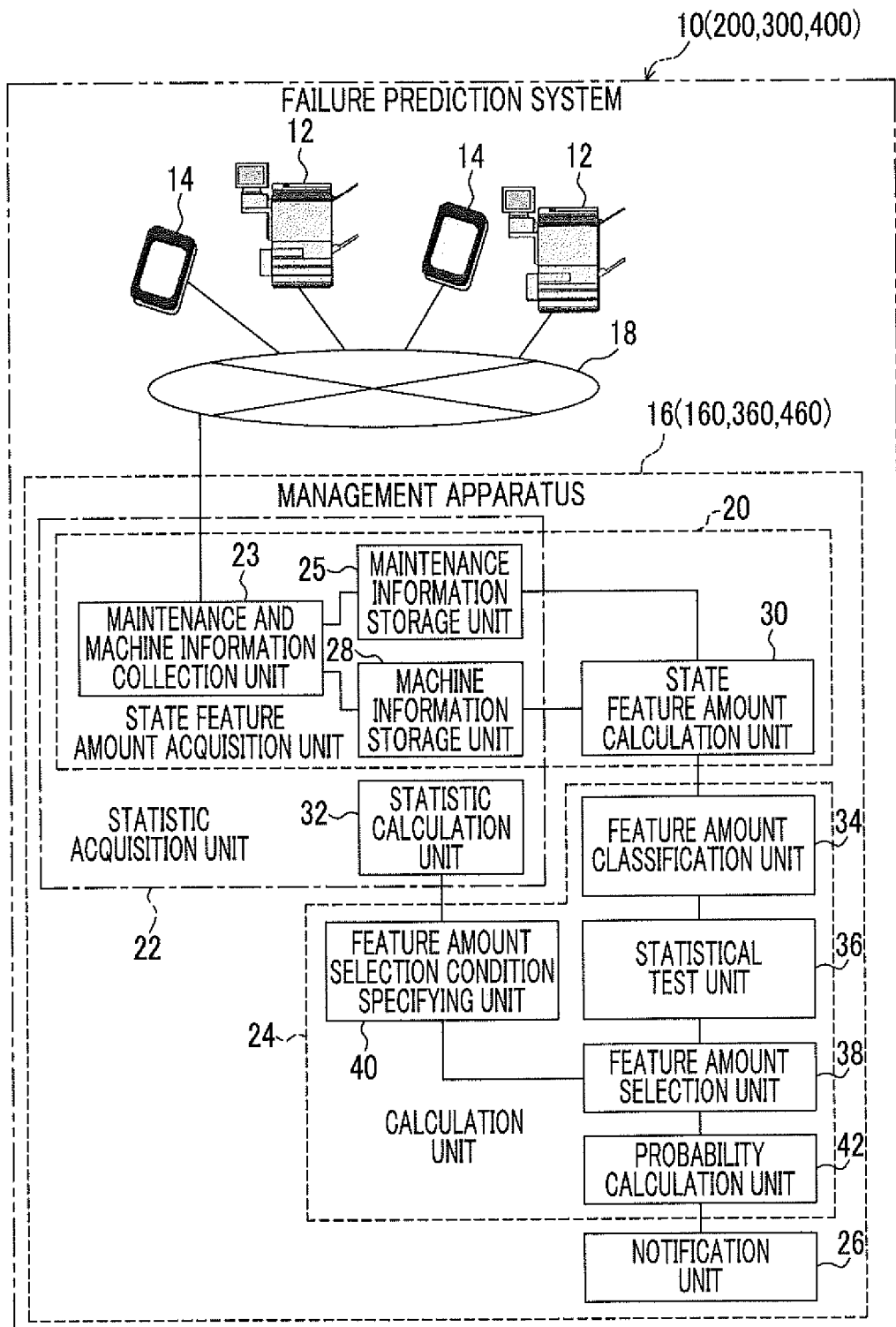

[DISTRIBUTION FOR NORMAL PERIOD]

[DISTRIBUTION FOR ABNORMAL PERIOD]

[DISTRIBUTION FOR NORMAL PERIOD]

[DISTRIBUTION FOR ABNORMAL PERIOD]

FIG. 6
TEMPERATURE STANDARD DEVIATION L
HUMIDITY STANDARD DEVIATION L
60
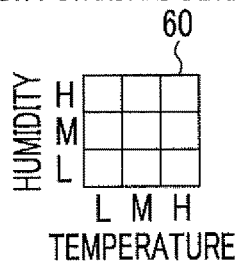
TEMPERATURE STANDARD DEVIATION L
HUMIDITY STANDARD DEVIATION H
62
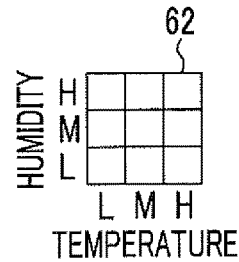
TEMPERATURE STANDARD DEVIATION H
HUMIDITY STANDARD DEVIATION L
64
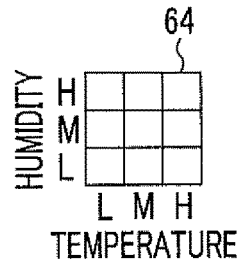
TEMPERATURE STANDARD DEVIATION H
HUMIDITY STANDARD DEVIATION H
66
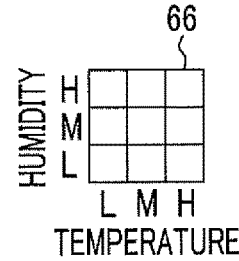
FIG. 7
60
| HUMIDITY | L | M | H |
|---|---|---|---|
| H | 0.0010 | 0.0008 | 0.0012 |
| M | 0.0010 | 0.0003 | 0.0005 |
| L | 0.0015 | 0.0001 | 0.0020 |
TEMPERATURE

FIG. 9

| TYPE OF STATE FEATURE AMOUNT | A | B | C | D | E | F | G | H | I | J |
|---|---|---|---|---|---|---|---|---|---|---|
| p-VALUE | 0.207 | $5 \times 10^{-25}$ | $5 \times 10^{-2}$ | $9 \times 10^{-20}$ | 0.187 | 0.102 | $7 \times 10^{-18}$ | $3 \times 10^{-2}$ | $5 \times 10^{-8}$ | $8 \times 10^{-4}$ |

FIG. 10

| TYPE OF STATE FEATURE AMOUNT | p-VALUE |
|---|---|
| a | 6.17E-08 |
| b | 8.91E-07 |
| c | 2.27E-06 |
| d | 5.73E-06 |
| e | 1.33E-05 |
| f | 9.01E-04 |
| g | 0.000261 |
| h | 0.000398 |
| i | 0.000903 |
| j | 0.001288 |
| k | 0.002785 |

FIG. 11

| TYPE OF STATE FEATURE AMOUNT | p-VALUE |
|---|---|
| a | 1.95E-05 |
| b | 2.13E-05 |
| c | 0.000251 |
| d | 0.000252 |
| e | 0.000422 |
| f | 0.000701 |
| g | 0.000924 |
| h | 0.000976 |
| i | 0.001024 |
| j | 0.001221 |
| k | 0.001419 |

(CONT.)

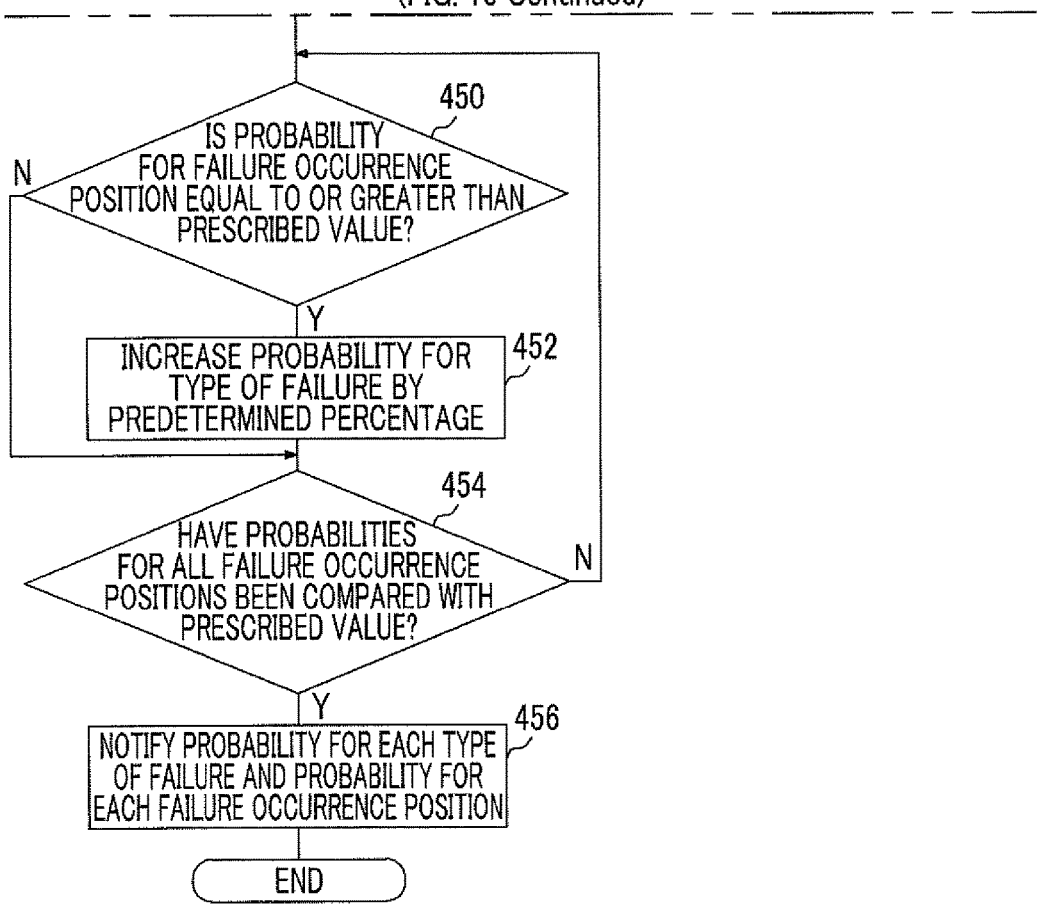

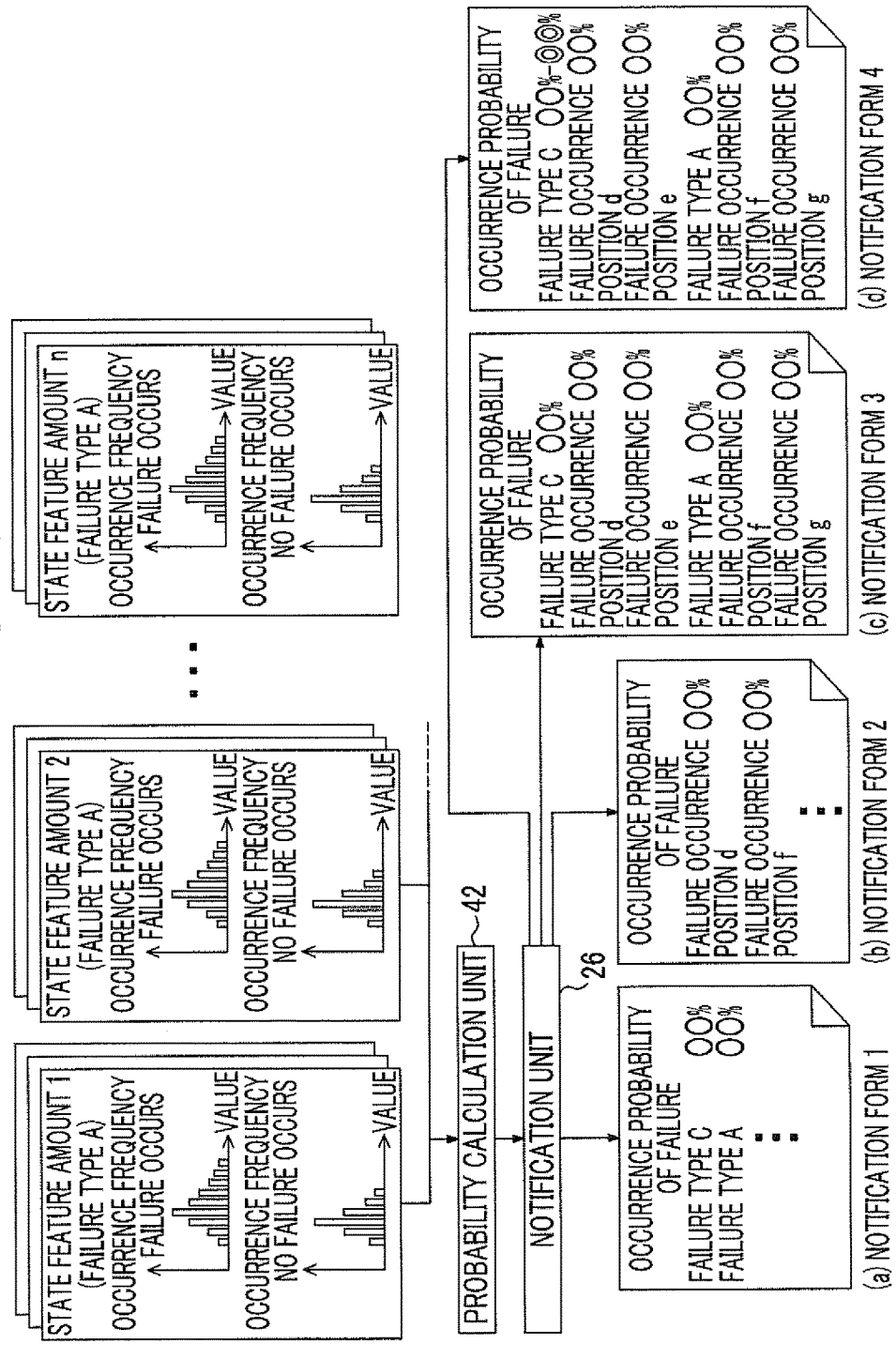

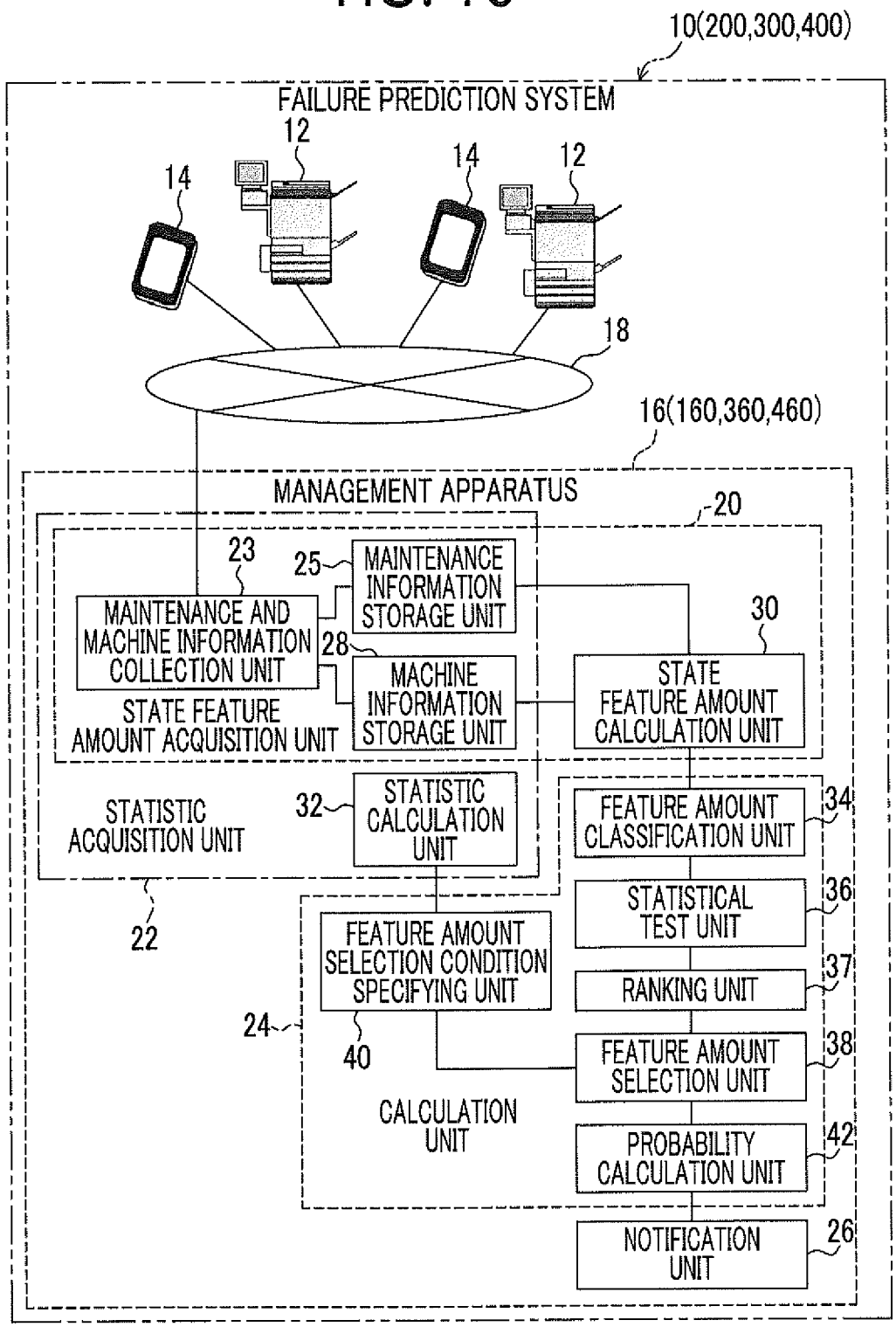

FIG. 19

| TYPE OF STATE FEATURE AMOUNT | A | B | C | D | E | F | G | H | I | J |
|---|---|---|---|---|---|---|---|---|---|---|
| p-VALUE | 0.207 | $5 \times 10^{-25}$ | $5 \times 10^{-2}$ | $9 \times 10^{-20}$ | 0.187 | 0.102 | $7 \times 10^{-18}$ | $3 \times 10^{-2}$ | $5 \times 10^{-8}$ | $8 \times 10^{-4}$ |
| RANKING | 10 | 1 | 7 | 2 | 9 | 8 | 3 | 6 | 4 | 5 |

FAILURE PREDICTION APPARATUS AND FAILURE PREDICTION SYSTEM

CROSS-REFERENCE TO RELATED APPLICATIONS

This application is based on and claims priority under 35 USC 119 from Japanese Patent Application No. 2014-217672 filed Oct. 24, 2014.

BACKGROUND

Technical Field

The present invention relates to a failure prediction apparatus and a failure prediction system.

SUMMARY

According to an aspect of the invention, there is provided a failure prediction apparatus including:

a state feature amount acquisition unit that acquires plural state feature amounts indicating features of an operating state of an apparatus to be monitored;

a statistic acquisition unit that acquires statistics of an environmental physical amount indicating an installation environment of the apparatus to be monitored for a specific period; and a calculation unit that acquires a selection condition corresponding to the statistics acquired by the statistic acquisition unit among plural selection conditions, and calculates probability of a failure occurring in the apparatus to be monitored, using the state feature amount satisfying the acquired selection condition, wherein the plural selection conditions are predetermined for each category of the statistics, and are conditions for selecting each of the state feature amounts required to calculate the probability of the failure occurring in the apparatus to be monitored.

BRIEF DESCRIPTION OF THE DRAWINGS

Exemplary embodiments of the present invention will be described in detail based on the following figures, wherein:

FIG. 1 is a schematic diagram illustrating an example of the structure of a main portion of a failure prediction system according to first to fourth exemplary embodiments;

FIG. 6 is a conceptual diagram illustrating an example of the structure of first to fourth feature amount specifying tables;

FIG. 7 is a conceptual diagram illustrating an example of the arrangement of threshold values in the first feature amount specifying table;

FIG. 9 is a correlation diagram illustrating an example of a correspondence relationship between the type of state feature amount and a p-value;

FIG. 10 is a correlation diagram that illustrates an example of the correspondence relationship between the type of state feature amount and the p-value and also illustrates a state in which the p-value less than a threshold value of 0.0003 is specified;

FIG. 11 is a correlation diagram that illustrates an example of the correspondence relationship between the type of state feature amount and the p-value and also illustrates a state in which the p-value less than a threshold value of 0.0001 is specified;

FIG. 17 is a conceptual diagram illustrating an example of notification forms according to the first to fourth exemplary embodiments;

FIG. 18 is a schematic diagram illustrating a modification example of the failure prediction system; and FIG. 19 is a conceptual diagram illustrating an example of a state in which a ranking unit ranks the types of state feature amounts and the p-values.

DETAILED DESCRIPTION

Figure 2A:
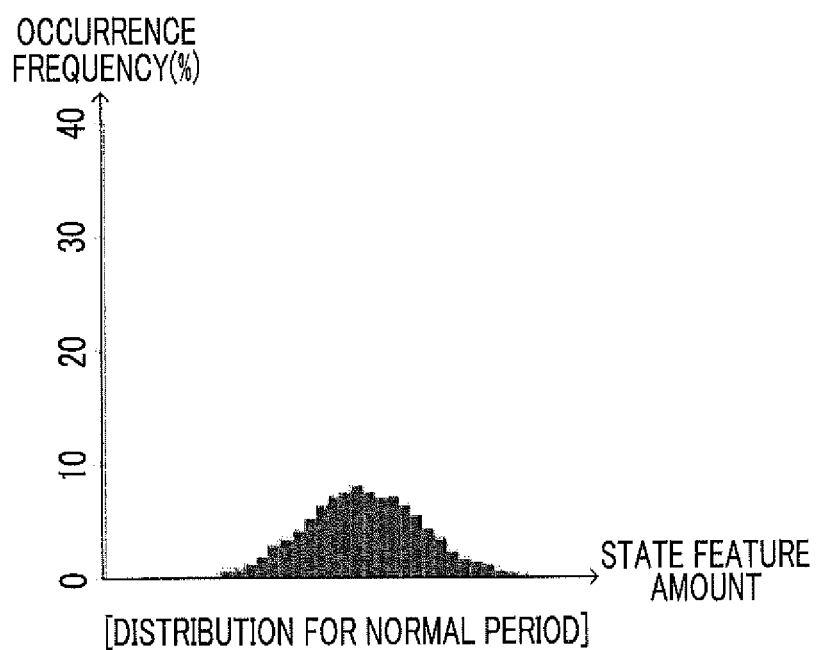
FIG. 2A is a distribution diagram illustrating an example of the distribution of a state feature amount of a type A for a normal period and FIG. 2B is a distribution diagram illustrating an example of the distribution of a state feature amount of a type A for an abnormal period.

Hereinafter, exemplary embodiments of the invention will be described in detail with reference to the drawings. Hereinafter, for convenience of explanation, an environment in which an image forming apparatus 12 is installed is referred to as an "installation environment". Hereinafter, for convenience of explanation, a place where the image forming apparatus 12 is installed is referred to as an "installation place". Hereinafter, for convenience of explanation, the type of failure is referred to as a "failure type". Hereinafter, for convenience of explanation, a position where a failure occurs is referred to as a "failure occurrence position".

First Exemplary Embodiment

For example, as illustrated in FIG. 1, a failure prediction system 10 includes plural image forming apparatuses 12, plural terminal apparatuses 14, and a management apparatus 16 which is an example of a failure prediction apparatus according to an exemplary embodiment of the invention, which are connected to each other through a communication network 18. An example of the communication network 18 is a dedicated line or an Internet network.

The image forming apparatus 12, which is an example of an apparatus to be monitored according to an exemplary embodiment of the invention, forms an image on a recording material, such as paper or an OHP sheet, and outputs the recording material. An example of the image forming apparatus 12 is a printer, a copier, a facsimile apparatus, or a multi-function machine having the functions of these apparatuses. In the first exemplary embodiment, for convenience of explanation, it is premised that the image forming apparatus 12 is a xerographic type. In addition, in the first exemplary embodiment, for convenience of explanation, it is premised that plural image forming apparatuses 12 connected to the communication network 18 are the same type.

The image forming apparatus 12 has a function of detecting a monitoring parameter and an environmental parameter related to an image forming process at any time while an image is being formed. The monitoring parameter is predetermined as a parameter which contributes to predicting the occurrence of a failure in the image forming apparatus 12 and is a functional physical amount unique to the functions of the image forming apparatus 12. Examples of the monitoring parameter include the potential of a photoconductor, the electrification current of the photoconductor, the amount of semiconductor laser light, the density of toner in a developing device, the transfer current of a primary transfer unit, the transfer current of a secondary transfer unit, the temperature of a roller included in a fixing device, and the density of a patch. In addition, examples of the environmental parameter include temperature and humidity in the installation environment of the image forming apparatus 12. The temperature and humidity in the installation environment of the image forming apparatus 12 are examples of an environmental physical amount according to the exemplary embodiment of the invention and are measured by, for example, a temperature sensor and a humidity sensor provided in the image forming apparatus 12.

When receiving a command to perform a series of processes (job) for forming images related to one page or plural pages on the recording material, the image forming apparatus 12 detects the monitoring parameter and the environmental parameter whenever forming the images on the recording material and outputting the recording material in response to the job execution command (for example, for each page). Then, after all of the image forming processes corresponding to the job execution command are completed, the image forming apparatus 12 transmits machine information including the monitoring parameter and the environmental parameter to the management apparatus 16 through the communication network 18.

The machine information is data including, for example, an apparatus ID for identifying a host apparatus, a job ID for identifying a job execution command, the monitoring parameter for each image forming process based on the job execution command, the environmental parameter, and detection date and time information indicating a detection date and time.

In the first exemplary embodiment, for convenience of explanation, the example in which the machine information is transmitted to the management apparatus 16 whenever the image forming process based on the job execution command is completed has been described. However, the invention is not limited thereto. For example, the machine information may be temporarily stored in a memory of the image forming apparatus 12 and the machine information which is stored in the memory and has not been transmitted may be transmitted to the management apparatus 16 when a predetermined transmission condition is satisfied. For example, when a predetermined period of time (for example, 1 hour) has elapsed, the machine information may be transmitted to the management apparatus 16. Alternatively, the machine information may be transmitted to the management apparatus 16 in response to a request from the management apparatus 16.

The terminal apparatus 14 is used by, for example, the administrator or maintenance worker of the image forming apparatus 12. An example of the terminal apparatus 14 is a personal computer, a smart device, or a wearable terminal apparatus.

The terminal apparatus 14 includes a communication interface, a receiving device, and a display device. The communication interface includes a wireless communication processor and an antenna and performs communication between the terminal apparatus 14 and an external apparatus connected to the communication network 18. In addition, the terminal apparatus 14 receives maintenance information related to maintenance work from, for example, a maintenance worker who visits the installation place of the image forming apparatus 12 and actually performs maintenance work or a person who receives a maintenance report, using the receiving device, and transmits the received maintenance information to the management apparatus 16. When the prediction result of the occurrence of a failure in the image forming apparatus 12 is transmitted from the management apparatus 16, the terminal apparatus 14 receives the prediction result and displays the received prediction result on the display device.

The maintenance information is data including, for example, an apparatus ID for identifying the image forming apparatus 12 to be subjected to maintenance, maintenance date and time information indicating the date and time when maintenance work has been performed, failure type information indicating the type of failure removed by the maintenance work, failure date and time information indicating the date and time when a failure has occurred, and failure occurrence position information indicating the position where a failure has occurred. That is, the maintenance information is also referred to as information indicating a trouble occurrence case.

The management apparatus 16 predicts the occurrence of a failure in the image forming apparatus 12 and includes a state feature amount acquisition unit 20, a statistic acquisition unit 22, a calculation unit 24, and a notification unit 26. All of plural image forming apparatuses 12 connected to the communication network 18 may be subjected to a failure prediction process. The user inputs an instruction to the management apparatus 16 to determine the image forming apparatus 12 to be subjected to the failure prediction process among the plural image forming apparatuses 12.

The state feature amount acquisition unit 20 acquires plural state feature amounts indicating the features of the operating state of the image forming apparatus 12. The state feature amount acquisition unit 20 acquires the state feature amounts from each of the plural image forming apparatuses 12 connected to the communication network 18. The state feature amount indicates, for example, the statistics of the monitoring parameter.

The statistic acquisition unit 22 acquires the statistics of the environmental physical amount indicating the installation environment of the image forming apparatus 12 for a specific period.

The calculation unit 24 calculates the probability of a failure occurring in the image forming apparatus to be subjected to the failure prediction process, using the state feature amount satisfying a selection condition which corresponds to the statistic acquired by the statistic acquisition unit 22 among plural selection conditions that are predetermined for each category of the statistics. Here, the image forming apparatus to be subjected to the failure prediction process indicates the image forming apparatus 12 which is to be subjected to the failure prediction process among plural image forming apparatuses 12. The plural selection conditions are conditions for selecting the state feature amount required to calculate the probability of a failure occurring in the image forming apparatus 12 among plural state feature amounts of the image forming apparatus 12.

The notification unit 26 notifies the probability calculated by the calculation unit 24. For example, probability information indicating the probability calculated by the calculation unit 24 is transmitted to the terminal apparatus 14 and the probability indicated by the probability information is displayed on the display device of the terminal apparatus 14.

The state feature amount acquisition unit 20 includes a maintenance and machine information collection unit 23, a maintenance information storage unit 25, a machine information storage unit 28, and a state feature amount calculation unit 30.

The maintenance and machine information collection unit 23 receives the machine information transmitted from the image forming apparatus 12, collects the machine information, and stores the collected machine information in the machine information storage unit 28 in time series. In this way, the maintenance and machine information collection unit 23 stores the machine information in the machine information storage unit 28. In addition, the maintenance and machine information collection unit 23 receives the maintenance information transmitted from the terminal apparatus 14, collects the maintenance information, and stores the collected maintenance information in the maintenance information storage unit 25 in time series. In this way, the maintenance and machine information collection unit 23 stores the maintenance information in the maintenance information storage unit 25.

The state feature amount calculation unit 30 calculates the state feature amount for each type of monitoring parameter based on the maintenance information and the machine information. That is, the state feature amount calculation unit 30 performs statistical processing on time-series data (time-series monitoring parameter) to calculate the state feature amount for each type of monitoring parameter. In the first exemplary embodiment, the mean value of the monitoring parameter for a period $\Delta T_1$ is used as an example of the state feature amount calculated by the state feature amount calculation unit 30. In the first exemplary embodiment, an example of the period $\Delta T_1$ is one day. However, the invention is not limited thereto. The period $\Delta T_1$ may be a period of one job, a period of a few jobs, or a period of a few days. In this exemplary embodiment, the mean value is used. However, the invention is not limited thereto. For example, an integral value, a correlation value between two parameters, or a data trend value may be used.

The statistic acquisition unit 22 includes the maintenance and machine information collection unit 23, the maintenance information storage unit 25, the machine information storage unit 28, and a statistic calculation unit 32.

The statistic calculation unit 32 calculates statistics for a period $\Delta T_2$ and a period $\Delta T_3$ based on the environmental parameter included in the machine information. Here, each of the period $\Delta T_2$ and the period $\Delta T_3$ is an example of a specific period according to an exemplary embodiment of the invention. The period $\Delta T_2$ indicates a period for which a failure has occurred in the image forming apparatus 12. For example, the period $\Delta T_2$ indicates a designated period (a designated period from the date when a failure has occurred as the initial date in reckoning) before the date and time when a failure has occurred in the image forming apparatus 12. The period $\Delta T_3$ indicates a period for which no failure has occurred in the image forming apparatus 12. For example, the period $\Delta T_3$ indicates a designated period other than the period $\Delta T_2$. In addition, a designated period in each of the period $\Delta T_2$ and the period $\Delta T_3$ is longer than the period $\Delta T_1$ and five days are used as the designated period in the first exemplary embodiment.

In the first exemplary embodiment, the statistics of temperature and the statistics of humidity for the period $\Delta T_2$ and the period $\Delta T_3$ are used as an example of the statistics calculated by the statistic calculation unit 32. In the first exemplary embodiment, the mean value and standard deviation of temperature are used as an example of the statistics of temperature and the mean value and standard deviation of humidity are used as an example of the statistics of humidity. Hereinafter, for convenience of explanation, the mean value of temperature is referred to as "mean temperature value" and the mean value of humidity is referred to as "mean humidity value". In addition, the standard deviation of temperature is referred to as a "temperature standard deviation" and the standard deviation of humidity is referred to as a "humidity standard deviation". The mean temperature value and the mean humidity value are examples of a first statistic according to the exemplary embodiment of the invention and the temperature standard deviation and the humidity standard deviation are examples of a second statistic according to the exemplary embodiment of the invention.

The calculation unit 24 includes a feature amount classification unit 34, a statistical test unit 36, a feature amount selection unit 38, a feature amount selection condition specifying unit 40, and a probability calculation unit 42.

The feature amount classification unit 34 classifies the state feature amounts calculated by the state feature amount calculation unit 30 into a state feature amount for the period $\Delta T_2$ and a state feature amount for the period $\Delta T_3$.

The statistical test unit 36 generates the frequency distribution of each of the state feature amounts for the period $\Delta T_2$ and the period $\Delta T_3$ classified by the feature amount classification unit 34 for each image forming apparatus 12. Then, the statistical test unit 36 applies a statistical test method to the frequency distribution of each of the state feature amounts for the period $\Delta T_2$ and the period $\Delta T_3$ to calculate a p-value for each type of state feature amount. The type of state feature amount indicates the type of monitoring parameter required to calculate the state feature amounts (for example, a charged voltage, a developing bias, and the amount of laser light). An example of the statistical test method is a mean value test, a Wilcoxon rank sum test, or a Kolmogorov-Smirnov test. However, the invention is not limited thereto. Hereinafter, for convenience of explanation, the frequency distribution of the state feature amount for the period $\Delta T_3$ is referred to as a "distribution for a normal period" and the frequency distribution of the state feature amount for the period $\Delta T_2$ is referred to as a "distribution for an abnormal period".

Figure 2B:
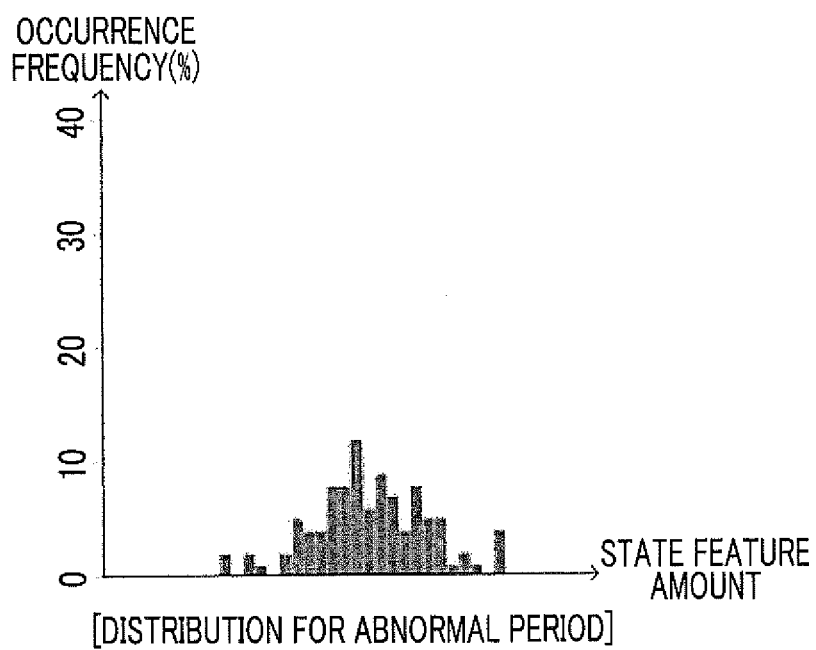
Figure 3A:
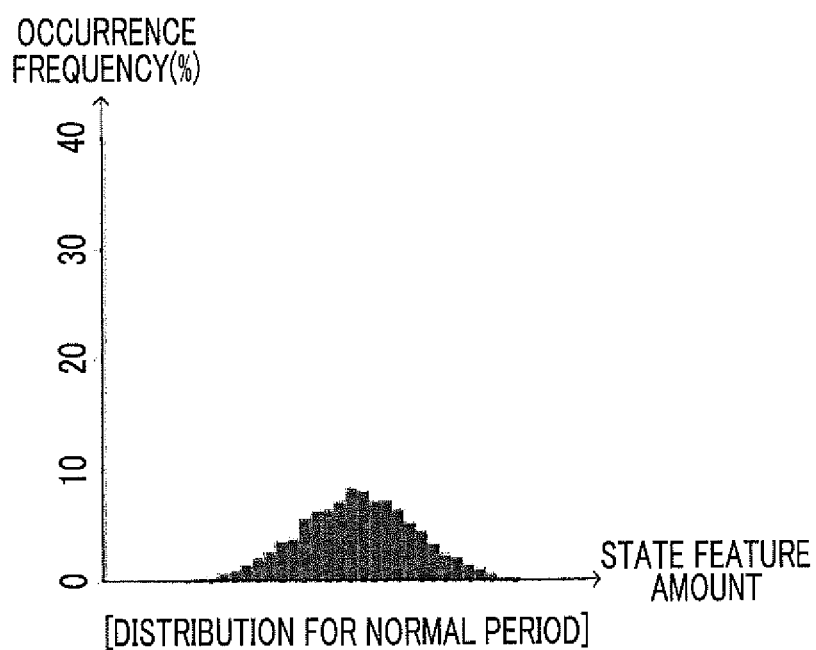
FIG. 3A is a distribution diagram illustrating an example of the distribution of a state feature amount of a type B for a normal period and FIG. 3B is a distribution diagram illustrating an example of the distribution of a state feature amount of a type B for an abnormal period.
Figure 3B:
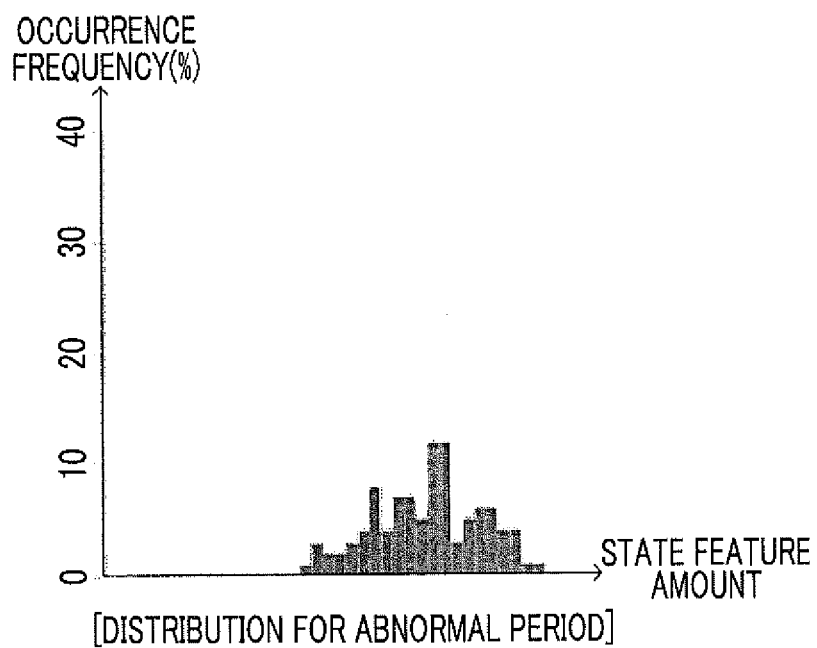

FIG. 2A illustrates an example of the distributions of a state feature amount of a type A for the normal period and FIG. 2B illustrates an example of the distributions of a state feature amount of a type A for the abnormal period. FIG. 3A illustrates an example of the distributions of a state feature amount of a type B for a normal period and FIG. 3B illustrates an example of the distributions of a state feature amount of a type B for an abnormal period. When the statistical test unit 36 applies the statistical test method to the distribution for the normal period and the distribution for the abnormal period illustrated in FIGS. 2A and 2B, "0.207" is calculated as the p-value. When the statistical test unit 36 applies the statistical test method to the distribution for the normal period and the distribution for the abnormal period illustrated in FIGS. 3A and 3B, "$4.69 \times 10^{-25}$" is calculated as the p-value.

The feature amount selection unit 38 selects a state feature amount which satisfies the selection condition specified by the feature amount selection condition specifying unit among plural types of state feature amounts.

The feature amount selection condition specifying unit 40 specifies one selection condition which corresponds to the statistics calculated by the statistic calculation unit 32 among plural selection conditions.

The probability calculation unit 42 calculates the probability of a failure occurring in the image forming apparatus 12 based on the state feature amount selected by the feature amount selection unit 38, using a Naive Bayes method.

Figure 4:
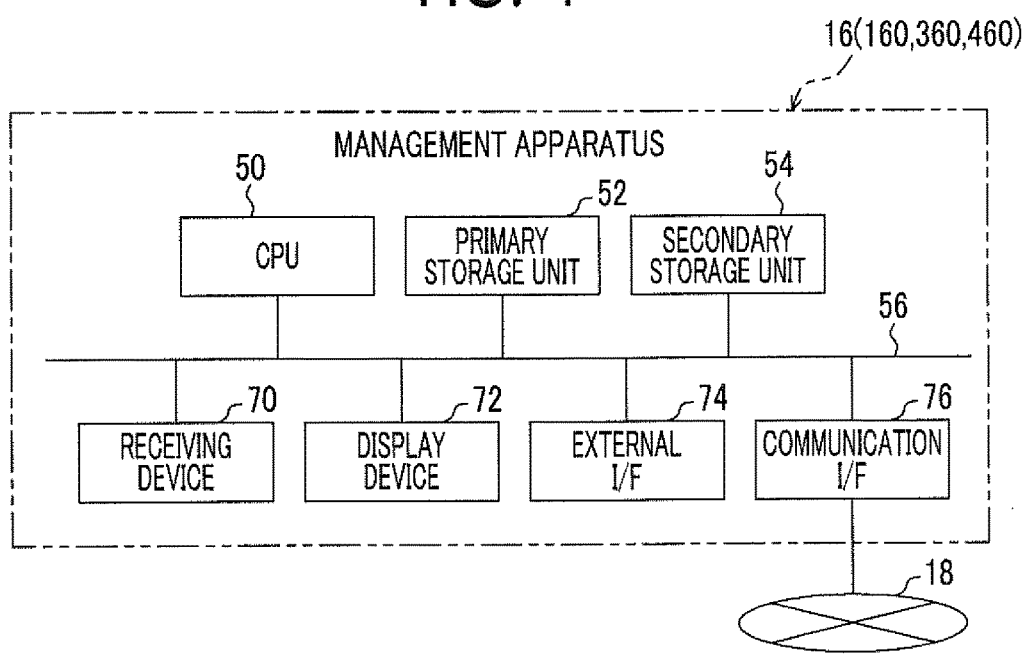
FIG. 4 is a block diagram illustrating an example of the hardware configuration of an electrical system of a management apparatus included in the failure prediction system according to the first to fourth exemplary embodiments.

For example, as illustrated in FIG. 4, the management apparatus 16 includes a central processing unit (CPU) 50, a primary storage unit 52, and a secondary storage unit 54. The primary storage unit 52 is a volatile memory (for example, a random access memory (RAM)) which is used as a work area or the like when various kinds of programs are executed. The secondary storage unit 54 is a non-volatile memory (for example, a flash memory or a hard disk drive (HDD)) which stores, for example, a control program for controlling the operation of the management apparatus 16 or various kinds of parameters in advance. The CPU 50, the primary storage unit 52, and the secondary storage unit 54 are connected to each other through a bus 56.

Figure 5:
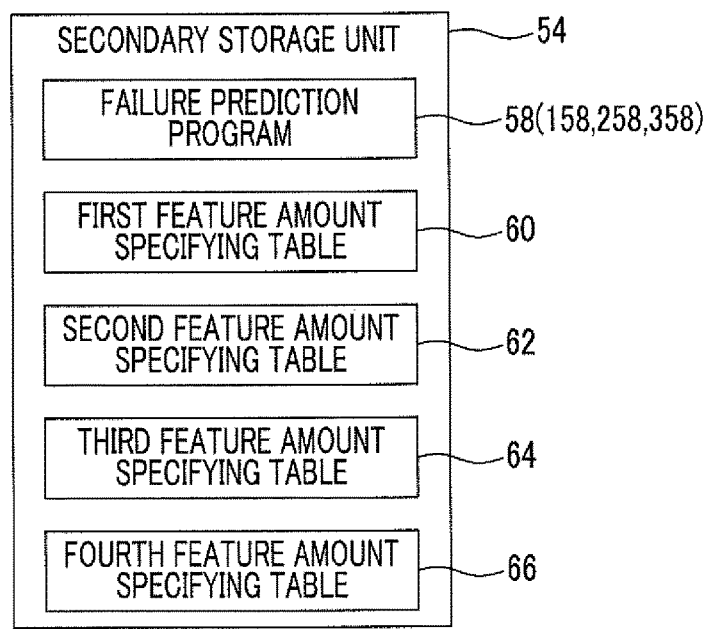
FIG. 5 is a conceptual diagram illustrating an example of content stored in a secondary storage unit of the management apparatus illustrated in FIG. 4.

For example, as illustrated in FIG. 5, the secondary storage unit 54 stores a failure prediction program 58. The CPU 50 reads the failure prediction program 58 from the secondary storage unit 54, develops the failure prediction program 58 in the primary storage unit 52, executes the failure prediction program 58, and functions as the state feature amount acquisition unit 20, the statistic acquisition unit 22, the calculation unit 24, and the notification unit 26. In addition, the functions of the state feature amount acquisition unit 20 and the statistic acquisition unit 22 are implemented by the CPU 50 and the secondary storage unit 54 is used as the maintenance information storage unit 25 and the machine information storage unit 28.

Here, the example in which the failure prediction program 58 is read from the secondary storage unit 54 has been described. However, the failure prediction program 58 is not necessarily stored in the secondary storage unit 54 at the beginning. For example, the failure prediction program 58 may be stored in any portable storage medium, such as a solid state drive (SSD), a DVD disk, an IC card, a magneto-optical disk, or a CD-ROM which is connected to the management apparatus 16 and is then used. Then, the CPU 50 may acquire the failure prediction program 58 from the portable storage medium and execute the failure prediction program 58. In addition, the failure prediction program 58 may be stored in a storage unit of another computer, another server apparatus or the like which is connected to the management apparatus 16 through the communication network 18 and the CPU 50 may acquire the failure prediction program 58 from, for example, another computer or another server apparatus and execute the failure prediction program 58.

The secondary storage unit 54 has a statistic storage area (not illustrated). The CPU 50 overwrites the statistics to the statistic storage area and saves the statistics. When the statistics are overwritten and saved, the content stored in the statistic storage area is updated to the latest statistics.

The secondary storage unit 54 has a state feature amount storage area (not illustrated). The CPU 50 overwrites the state feature amount to the state feature amount storage area and saves the state feature amount. When the state feature amount is overwritten and saved, the content stored in the state feature amount storage area is updated to the latest state feature amount.

For example, as illustrated in FIG. 5, the secondary storage unit 54 stores a first feature amount specifying table 60, a second feature amount specifying table 62, a third feature amount specifying table 64, and a fourth feature amount specifying table 66. Hereinafter, for convenience of explanation, when the first feature amount specifying table 60, the second feature amount specifying table 62, the third feature amount specifying table 64, and the fourth feature amount specifying table 66 do not need to be distinguished from each other, they are referred to as "feature amount specifying tables" without a reference numeral. In addition, the feature amount specifying table is an example of associating information according to the exemplary embodiment of the invention.

The feature amount specifying table is referred to when the feature amount selection condition specifying unit 40 specifies one selection condition among plural selection conditions. For example, as illustrated in FIG. 6, the first feature amount specifying table 60, the second feature amount specifying table 62, the third feature amount specifying table 64, and the fourth feature amount specifying table 66 are determined for each combination of the categories of the temperature standard deviations and the categories of the humidity standard deviations.

The temperature standard deviations are classified into two categories, that is, a "high" (H) category and a "low" (L) category and the humidity standard deviations are also classified into two categories, that is, a "high" category and a "low" category. Hereinafter, for convenience of explanation, the temperature standard deviation which is classified into the "high" category is referred to as a temperature standard deviation H and the temperature standard deviation which is classified into the "low" category is referred to as a temperature standard deviation L. In addition, hereinafter, for convenience of explanation, the humidity standard deviation which is classified into the "high" category is referred to as a humidity standard deviation H and the humidity standard deviation which is classified into the "low" category is referred to as a humidity standard deviation L. The temperature standard deviations H and L and the humidity standard deviations H and L are examples of the categories of the second statistic according to the exemplary embodiment of the invention.

The first feature amount specifying table 60 is associated with the temperature standard deviation L and the humidity standard deviation L. The second feature amount specifying table 62 is associated with the temperature standard deviation L and the humidity standard deviation H. The third feature amount specifying table 64 is associated with the temperature standard deviation H and the humidity standard deviation L. The fourth feature amount specifying table 66 is associated with the temperature standard deviation H and the humidity standard deviation H.

The feature amount selection condition specifying unit 40 acquires a feature amount specifying table corresponding to the temperature standard deviation and the humidity standard deviation which are calculated as the statistics by the statistic calculation unit 32 based on the first feature amount specifying table 60, the second feature amount specifying table 62, the third feature amount specifying table 64, and the fourth feature amount specifying table 66.

The feature amount specifying table includes plural threshold values which are compared with the p-value. The threshold values are determined for each combination of the categories of the mean temperature value and the categories of the mean humidity value. In addition, the threshold value included in the feature amount specifying table is an example of the selection condition according to the exemplary embodiment of the invention. Therefore, the feature amount selection unit 38 selects a state feature amount corresponding to the p-value less than the threshold value, which is specified as the selection condition by the feature amount selection condition specifying unit 40, among plural types of state feature amounts.

The mean temperature value is classified into three categories, that is, "high", "middle (M)", and "low" categories. The mean humidity value is also classified into three categories, that is, "high", "middle", and "low" categories. Hereinafter, for convenience of explanation, the mean temperature value which is classified into the "high" category is referred to as mean temperature value H, the mean temperature value which is classified into the "middle" category is referred to as mean temperature value M, the mean temperature value which is classified into the "low" category is referred to as mean temperature value L. In addition, hereinafter, for convenience of explanation, the mean humidity value which is classified into the "high" category is referred to as mean humidity value H, the mean humidity value which is classified into the "middle" category is referred to as mean humidity value M, and the mean humidity value which is classified into the "low" category is referred to as mean humidity value L. The mean temperature values H, M, and L and the mean humidity values H, M, and L are examples of the categories of the first statistic according to the exemplary embodiment of the invention.

For example, as illustrated in FIG. 7, the first feature amount specifying table 60 includes different threshold values for each combination of the mean temperature value and the mean humidity value. The feature amount selection condition specifying unit 40 specifies a threshold value corresponding to the mean temperature value and the mean humidity value, which are calculated as the statistics by the statistic calculation unit 32, among plural threshold values included in the first feature amount specifying table 60. For example, according to the first feature amount specifying table 60 illustrated in FIG. 7, when the statistic calculation unit 32 calculates statistics (the mean temperature value and the mean humidity value) belonging to the mean temperature value M and the mean humidity value M, the threshold value specified by the feature amount selection condition specifying unit 40 is "0.0003".

For example, as illustrated in FIG. 4, the management apparatus 16 includes a receiving device 70 and a display device 72. The receiving device 70 is, for example, a keyboard, a mouse, and a touch panel and receives various kinds of information from the user. The receiving device 70 is connected to the bus 56 and the CPU 50 acquires various kinds of information received by the receiving device 70.

The display device 72 is, for example, a liquid crystal display and the touch panel of the receiving device 70 overlaps a display surface of the liquid crystal display. The display device 72 is connected to the bus 56 and displays various kinds of information under the control of the CPU 50.

The management apparatus 16 includes an external interface (I/F) 74. The external I/F 74 is connected to the bus 56. The external I/F 74 is connected to an external device, such as a USB memory or an external hard disk device, and receives and transmits various kinds of information between the external device and the CPU 50.

The management apparatus 16 includes a communication I/F 76. The communication I/F 76 is connected to the bus 56. The communication I/F 76 is connected to the communication network 18 and transmits and receives various kinds of information between the CPU 50, and the image forming apparatus 12 and the terminal apparatus 14.

Next, the failure prediction process which is performed by the execution of the failure prediction program 58 by the CPU 50 when the start condition of the failure prediction process for predicting the occurrence of a failure in the image forming apparatus to be subjected to the failure prediction process is satisfied will be described with reference to FIG. 8. The start condition indicates the condition at which the terminal apparatus 14 transmits a start instruction signal indicating an instruction to start the failure prediction process and the management apparatus 16 receives the start instruction signal. However, the start condition is not limited thereto. For example, the start condition may be the condition at which the receiving device 70 receives the instruction to start the failure prediction process.

Figure 8:
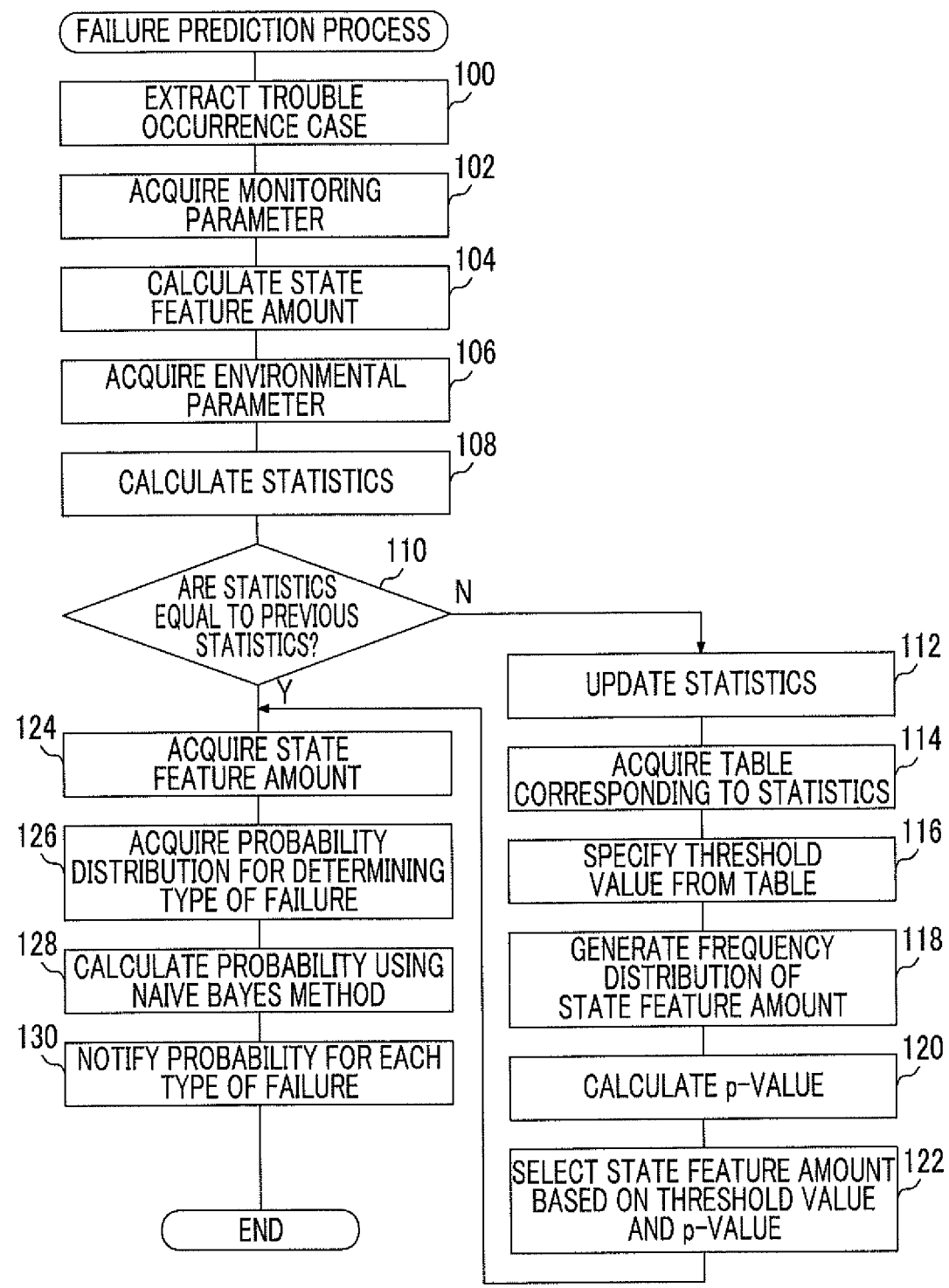
FIG. 8 is a flowchart illustrating an example of the flow of a failure prediction process according to the first exemplary embodiment.

In the failure prediction process illustrated in FIG. 8, first, in Step 100, the state feature amount calculation unit 30 extracts the maintenance information as the trouble occurrence case from the maintenance information storage unit 25.

Then, in Step 102, the state feature amount calculation unit 30 extracts the machine information corresponding to the maintenance information extracted in Step 100 from the machine information storage unit 28. Then, the state feature amount calculation unit 30 acquires, based on the extracted machine information, the monitoring parameter for each period $\Delta T_1$ for each preset type of monitoring parameter which has been associated with the type of failure in the image forming apparatus 12 in advance. The preset type of monitoring parameter indicates the type of monitoring parameter which contributes to predicting the occurrence of a failure. For example, in Step 102, when image quality deteriorates due to a change in density, for example, a charged voltage, a developing bias, and the amount of laser light are acquired as the monitoring parameters.

Then, in Step 104, the state feature amount calculation unit 30 calculates the state feature amount based on the monitoring parameter, which is acquired for each period $\Delta T_1$ in Step 102, for each image forming apparatus 12. The type of monitoring parameter required to calculate the state feature amount in Step 104 is predetermined for each type of failure.

Then, in Step 106, the statistic calculation unit 32 acquires the environmental parameter of the image forming apparatus 12, in which a failure has occurred, for each period $\Delta T_1$ based on the machine information extracted in Step 102.

Then, in Step 108, the statistic calculation unit 32 calculates the statistics of the environmental parameter acquired in Step 106 for each of the period $\Delta T_2$ and the period $\Delta T_3$, with reference to the maintenance information extracted in Step 100.

Then, in Step 110, the statistic calculation unit 32 determines whether the statistics calculated in Step 108 are equal to the statistics (previous statistics) stored in the statistic storage area of the secondary storage unit 54. When it is determined in Step 110 that the statistics calculated in Step 108 are not equal to the previous statistics, that is, when the determination result is "No", the process proceeds to Step 112. When it is determined in Step 110 that the statistics calculated in Step 108 are equal to the previous statistics, that is, when the determination result is "Yes", the process proceeds to Step 124.

In Step 112, the statistic calculation unit 32 overwrites the statistics calculated in Step 108 to the statistic storage area of the secondary storage unit 54 and saves the statistics to update the content stored in the statistic storage area to the latest statistic.

Then, in Step 114, the feature amount selection condition specifying unit 40 acquires a feature amount specifying table corresponding to the latest temperature standard deviation and humidity standard deviation, which are the latest statistics updated in Step 112, from the secondary storage unit 54.

Then, in Step 116, the feature amount selection condition specifying unit 40 specifies a threshold value corresponding to the latest mean temperature value and mean humidity value, which are the latest statistics updated in Step 112, based on the feature amount specifying table acquired in Step 114.

Then, in Step 118, the feature amount classification unit 34 classifies the state feature amounts calculated in Step 104 into the state feature amount for the period $\Delta T_2$ and the state feature amount for the period $\Delta T_3$, with reference to the maintenance information extracted in Step 100. Then, the statistical test unit 36 generates the frequency distributions of the state feature amounts for the period $\Delta T_2$ and the period $\Delta T_3$, which are classified by the feature amount classification unit 34, for each of plural types of predetermined state feature amounts corresponding to the type of failure in the image forming apparatus to be subjected to the failure prediction process. Here, the distribution of a value obtained by normalizing the frequency value of each of the state feature amounts for the period $\Delta T_2$ and the period $\Delta T_3$ is used as an example of the frequency distribution. However, the invention is not limited thereto. For example, in order to correct a variation in the state feature amount between the image forming apparatuses 12, the statistical test unit 36 may calculate the mean value and standard deviation of the state feature amount for each image forming apparatus 12, normalize the state feature amount, and generate the frequency distribution.

Then, in Step 120, for example, as illustrated in FIG. 9, the statistical test unit 36 applies the statistical test method to the frequency distributions of the state feature amounts for the period $\Delta T_2$ and the period $\Delta T_3$ for each type of state feature amount to calculate the p-value for each type of state feature amount.

Figure 12:
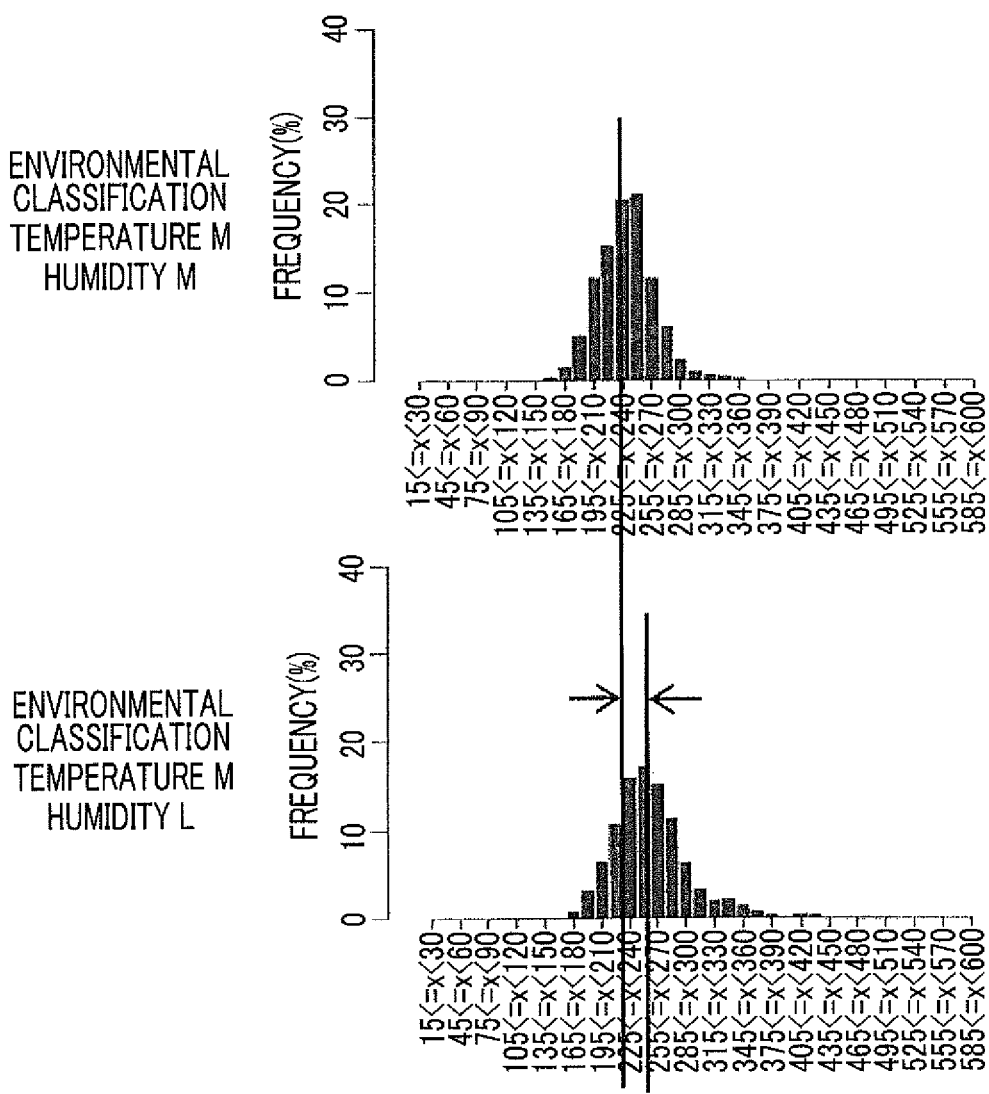
FIG. 12 is a distribution diagram illustrating an example of a distribution for the normal period in the related art when an environmental classification is changed from temperature M and humidity M to temperature M and humidity L.
Figure 13:
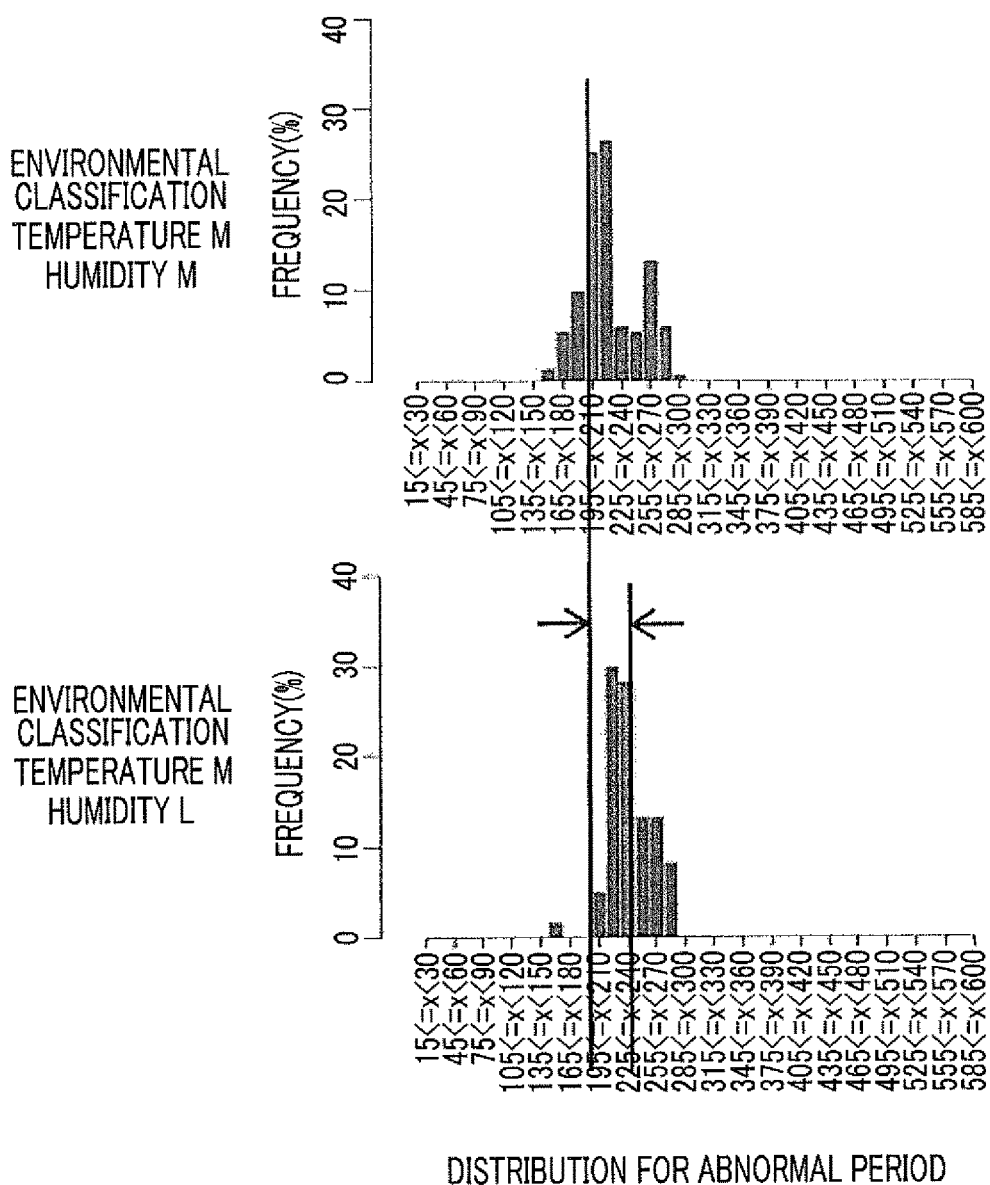
FIG. 13 is a distribution diagram illustrating an example of a distribution for the abnormal period in the related art when the environmental classification is changed from temperature M and humidity M to temperature M and humidity L.

However, for example, as illustrated in FIGS. 12 and 13, when the environmental classification (temperature and humidity) is changed, the distribution for the normal period and the distribution for the abnormal period are also changed. This phenomenon causes a reduction in a false detection rate (the probability of predictions on the occurrence of a failure being wrong) and a low trouble coverage rate (the probability of predictions on the occurrence of a failure being right), as illustrated in, for example, the following Table 1.

TABLE 1

|  | Temperature M Humidity M | Temperature M Humidity L |
|---|---|---|
| False detection rate | 9.5% | 44.1% |
| Trouble coverage rate | 71.4% | 33.3% |

Then, in Step 122, the feature amount selection unit 38 selects a state feature amount among the plural types of state feature amounts calculated in Step 104 based on the threshold values specified in Step 116 and the p-value calculated in Step 120. Then, the feature amount selection unit 38 overwrites the selected state feature amount to the state feature amount storage area of the secondary storage unit 54 and saves the state feature amount to update the content stored in the state feature amount storage area to the latest state feature amount.

In Step 122, for example, when a threshold value of "0.0003" is specified based on the feature amount specifying table in Step 116, for example, the p-value in the dashed frame illustrated in FIG. 10 is selected and the state feature amount is selected. The p-value in the dashed frame illustrated in FIG. 10 is less than "0.0003". Therefore, in the example illustrated in FIG. 10, the state feature amounts of types a to g are selected.

In Step 122, for example, when a threshold value of "0.0001" is specified based on the feature amount specifying table in Step 116, for example, the p-value in the dashed frame illustrated in FIG. 11 is selected and the state feature amount is selected. The p-value in the dashed frame illustrated in FIG. 11 is less than "0.0001". Therefore, in the example illustrated in FIG. 11, the state feature amounts of types a to k are selected.

Then, in Step 124, the probability calculation unit 42 acquires the state feature amount stored in the state feature amount storage area of the secondary storage unit 54.

Then, in Step 126, the probability calculation unit 42 acquires a probability distribution for determining the type of failure based on the frequency distributions generated in Step 118, based on the type of state feature amount acquired in Step 124. That is, in Step 126, a frequency distribution corresponding to the type of state feature amount acquired in Step 124 is acquired as the probability distribution for determining the type of failure based on the frequency distributions generated in Step 118.

Then, in Step 128, the probability calculation unit 42 calculates the probability of a failure occurring in the image forming apparatus to be subjected to the failure prediction process in the near future for each type of failure, using the Naive Bayes method, based on the state feature amount acquired in Step 124 and the probability distribution for determining the type of failure which is acquired in Step 126.

That is, in Step 128, the probability of a failure T occurring in the image forming apparatus to be subjected to the failure prediction process is calculated by the following Expression (1). Expression (1) is established on the assumption that there is no correlation between the state feature amounts. In Expression (1), T is the type of a failure, the probability of which is to be calculated. In addition, $x_i$ is the value of each of n types of state feature amounts $X_i$ ($1 \le i \le n$) related to the failure T which are calculated based on m types of monitoring parameters $P_j$ ($1 \leq j \leq m$) included in the latest machine information of the image forming apparatus in which the failure T is predicted to occur.

$$P((T = \text{yes})|x_1, x_2, \ldots, x_n) = \frac{P(T = \text{yes}) \cdot \prod_{i=1}^{n} P(x_1|(T = \text{yes}))}{P(T = \text{yes}) \cdot \prod_{i=1}^{n} P(x_i|(T = \text{yes})) + P(T = \text{no}) \cdot \prod_{i=1}^{n} P(x_i|(T = \text{no}))} \quad (1)$$

In Expression 1, P(T=yes) is the probability (prior probability) of the failure T occurring, P(T=no) is the probability (prior probability) of the failure T not occurring, and P(T=yes)+P(T=no)=1 is established.

In addition, $P(x_i|(T=\text{yes}))$ is the probability that the value of an i-th state feature amount $X_i$ will be $x_i$ when the failure T occurs and the probability of $x_i$ in the probability distribution for determining the type of failure (a failure occurs) for the state feature amount $X_i$ corresponding to the failure T is used.

Furthermore, $P(x_i|(T=\text{no}))$ is the probability that the value of the i-th state feature amount $X_i$ will be $x_i$ when the failure T does not occur and a probability of $x_i$ in the probability distribution for determining the type of failure (no failure occurs) for the state feature amount $X_i$ corresponding to the failure T is used.

That is, the probability calculation unit 42 calculates the probability $[P((T=\text{yes})|x_1, x_2, \ldots, x_n)]$ of the failure T occurring in the image forming apparatus to be subjected to the failure prediction process based on $[P(T=\text{yes}) \cdot \Pi P(x_i|(T=\text{yes}))]$ and $[P(T=\text{no}) \cdot \Pi P(x_i|(T=\text{no}))]$ using Expression (1).

Here, $[P(T=\text{yes}) \cdot \Pi P(x_i|(T=\text{yes}))]$ indicates a value obtained by multiplying the probability (prior probability) of the failure T occurring by the probability of obtaining a combination $(x_1, x_2, \ldots, x_n)$ of the values of n types of state feature amounts $X_i$ ($1 \leq i \leq n$) when the failure T occurs.

In addition, $[P(T=\text{no}) \cdot \Pi P(x_i|(T=\text{no}))]$ indicates a value obtained by multiplying the probability (prior probability) of the failure T not occurring by the probability of obtaining a combination $(x_1, x_2, \ldots, x_n)$ of the values of n types of state feature amounts $X_i$ ($1 \leq i \leq n$) when the failure T does not occur.

Then, in Step 130, the notification unit 26 notifies the probability which has been calculated for each type of failure by the probability calculation unit 42. Then, the failure prediction process ends. The probability is displayed on at least one of the display device 72 and the display of the terminal apparatus 14 to notify the probability. In addition, the notification unit 26 may notify all of the probabilities calculated by the probability calculation unit 42. However, the invention is not limited thereto. The notification unit 26 may notify a predetermined probability (for example, 80%) or more. In addition, when the probability is notified, it is preferable that the probability is notified in descending order. In addition, for example, as illustrated in (a) of FIG. 17, the process in Step 130 is performed to notify the probability for each type of failure in the form of a list and the probability for each type of failure is displayed in descending order.

As such, in Step 122, the state feature amount is selected based on the threshold value and the p-value and the probability is calculated based on the selected state feature amount. Therefore, as illustrated in the following Table 2 as an example, a reduction in the false detection rate and the trouble coverage rate is suppressed, as compared to Table 1 according to the related art.

TABLE 2

|  | Temperature M Humidity M | Temperature M Humidity L |
| --- | --- | --- |
| False detection rate | 9.5% | 16.7% |
| Trouble coverage rate | 71.4% | 75.0% |

Second Exemplary Embodiment

In the first exemplary embodiment, the example in which the probability is calculated for each type of failure has been described. However, in a second exemplary embodiment, a case in which probability is calculated for each failure occurrence position will be described. In the second exemplary embodiment, the same components as those in the first exemplary embodiment are denoted by the same reference numerals and the description thereof will not be repeated.

For example, as illustrated in FIG. 1, a failure prediction system 200 according to the second exemplary embodiment differs from the failure prediction system 10 according to the first exemplary embodiment in that it includes a management apparatus 160 instead of the management apparatus 16. In addition, for example, as illustrated in FIG. 5, the management apparatus 160 differs from the management apparatus 16 in that the secondary storage unit 54 stores a failure prediction program 158 instead of the failure prediction program 58.

Next, a failure prediction process according to the second exemplary embodiment which is performed by the CPU 50 by the execution of the failure prediction program 158 by the CPU 50 when the start condition of the failure prediction process is satisfied will be described with reference to FIG. 14. The failure prediction process according to the second exemplary embodiment differs from the failure prediction process according to the first exemplary embodiment in that it includes Step 250 instead of Step 118, includes Step 252 instead of Step 126, includes Step 254 instead of Step 128, and includes Step 256 instead of Step 130. Hereinafter, the steps in which the same processes as those in the steps included in the flowchart illustrated in FIG. 8 are performed are denoted by the same step numbers as those in FIG. 8 and the description thereof will not be repeated.

Figure 14:
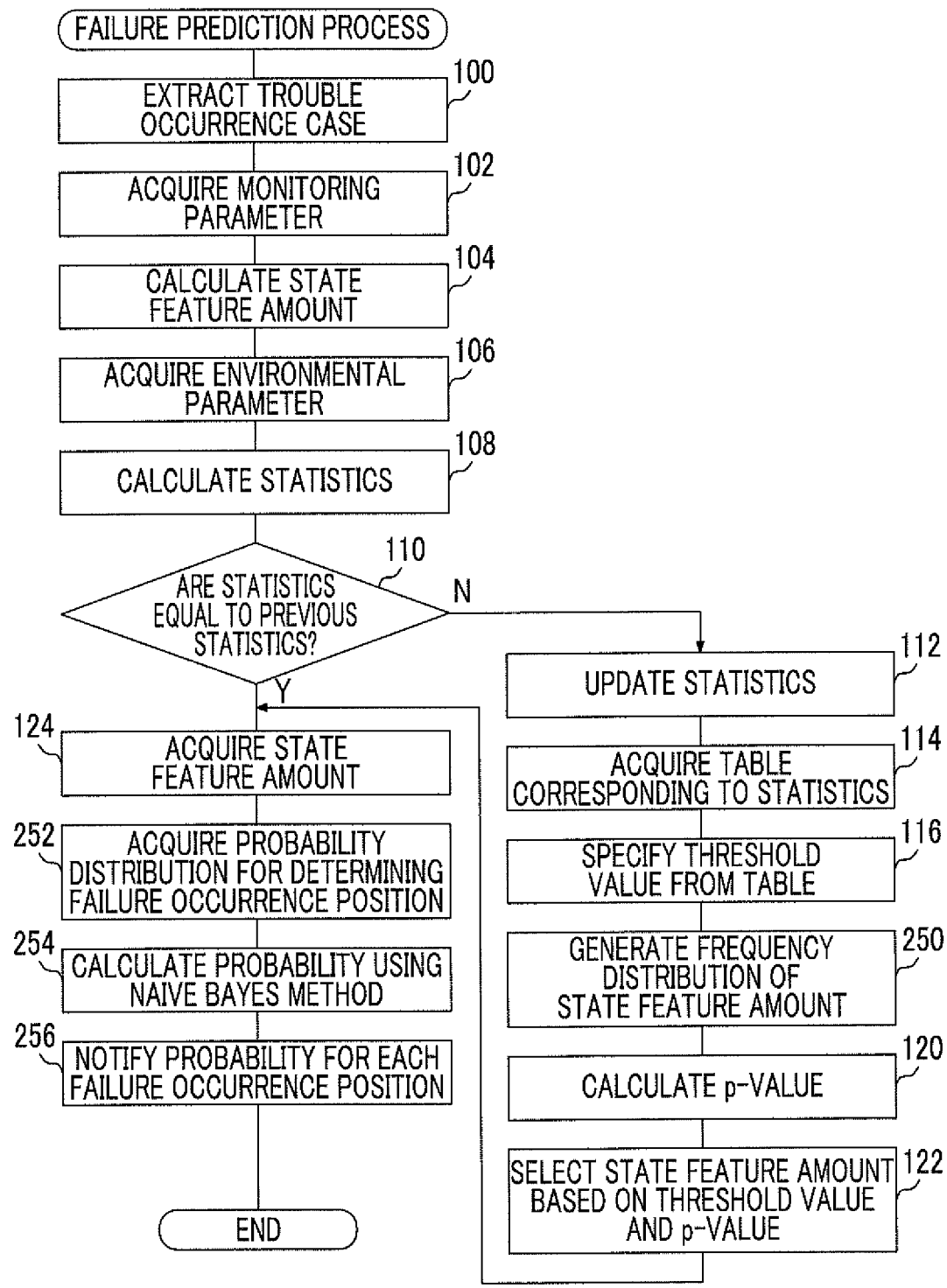
FIG. 14 is a flowchart illustrating an example of the flow of a failure prediction process according to a second exemplary embodiment.

In the failure prediction process illustrated in FIG. 14, in Step 250, the feature amount classification unit 34 classifies the state feature amounts calculated in Step 104 into a state feature amount for a period $\Delta T_2$ and a state feature amount for a period $\Delta T_3$, with reference to the maintenance information extracted in Step 100. Then, the statistical test unit 36 generates the frequency distribution of each of the state feature amounts for the period $\Delta T_2$ and the period $\Delta T_3$ classified by the feature amount classification unit 34 for each of plural types of predetermined state feature amounts corresponding to the failure occurrence position of the image forming apparatus to be subjected to the failure prediction process.

In Step 252, the probability calculation unit 42 acquires a probability distribution for determining a failure occurrence position based on the frequency distributions generated in Step 250 based on the type of state feature amount acquired in Step 124. That is, in Step 252, a frequency distribution corresponding to the type of state feature amount acquired in Step 124 is acquired as the probability distribution for determining a failure occurrence position based on the frequency distributions generated in Step 250.

Then, in Step 254, the probability calculation unit 42 calculates the probability of a failure occurring in the image forming apparatus to be subjected to the failure prediction process in the near future for each failure occurrence position, based on the state feature amount acquired in Step 124 and the probability distribution for determining a failure occurrence position which is acquired in Step 252, using the Naive Bayes method.

That is, in Step 254, the probability of a failure T occurring in the image forming apparatus to be subjected to the failure prediction process is calculated by Expression (1). In addition, Expression (1) is established on the assumption that there is no correlation between the state feature amounts. In Expression (1), T is a failure occurrence position where the probability of a failure occurring is calculated. In addition, $x_i$ is the value of each of n types of state feature amounts $X_i$ ($1 \le i \le n$) related to the failure T which are calculated based on m types of monitoring parameters $P_j$ ($1 \le j \le m$) included in the latest machine information of the image forming apparatus in which the failure T is predicted to occur.

In Step 256, the notification unit 26 notifies the probability which has been calculated for each failure occurrence position by the probability calculation unit 42. Then, the failure prediction process ends. In addition, for example, as illustrated in (b) of FIG. 17, the process in Step 256 is performed to notify the probability for each failure occurrence position in the form of a list and the probability for each failure occurrence position is displayed in descending order.

Third Exemplary Embodiment

In the first exemplary embodiment, the case in which the probability is calculated for each type of failure has been described. However, in a third exemplary embodiment, a case in which probability is calculated for each type of failure and each failure occurrence position will be described. In the third exemplary embodiment, the same components as those in the first and second exemplary embodiments are denoted by the same reference numerals and the description thereof will not be repeated.

For example, as illustrated in FIG. 1, a failure prediction system 300 according to the third exemplary embodiment differs from the failure prediction system 10 according to the first exemplary embodiment in that it includes a management apparatus 360 instead of the management apparatus 16. In addition, for example, as illustrated in FIG. 5, the management apparatus 360 differs from the management apparatus 16 in that the secondary storage unit 54 stores a failure prediction program 258 instead of the failure prediction program 58.

Next, a failure prediction process according to the third exemplary embodiment which is performed by the CPU 50 by the execution of the failure prediction program 258 by the CPU 50 when the start condition of the failure prediction process is satisfied will be described with reference to FIG. 15. The failure prediction process according to the third exemplary embodiment differs from the failure prediction process according to the first exemplary embodiment in that it includes Step 350 instead of Step 118 and includes Steps 352, 354, and 356 instead of Steps 128 and 130. Hereinafter, the steps in which the same processes as those in the steps included in the flowchart illustrated in FIG. 8 are performed are denoted by the same step numbers as those in FIG. 8 and the description thereof will not be repeated.

Figure 15:
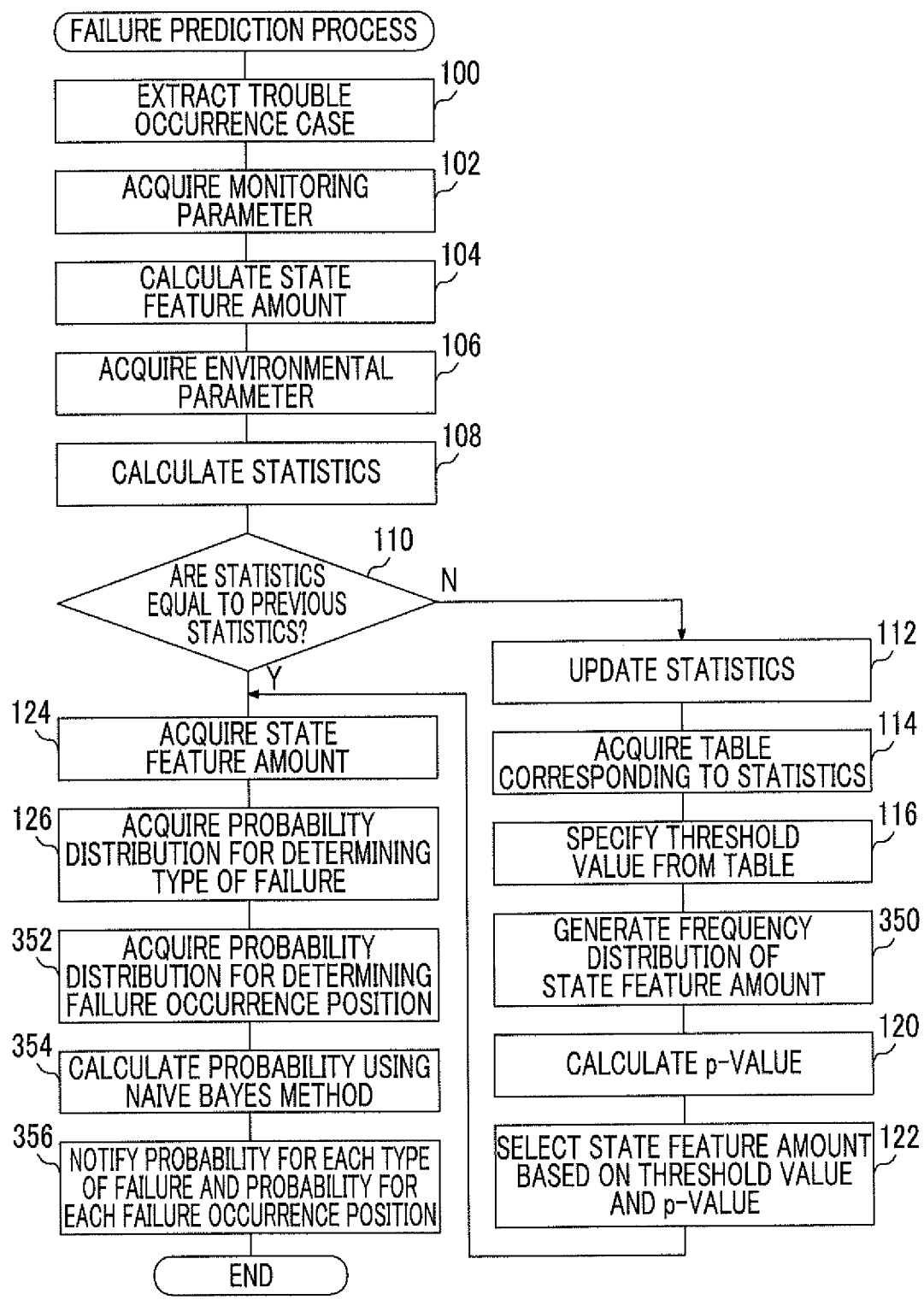
FIG. 15 is a flowchart illustrating an example of the flow of a failure prediction process according to a third exemplary embodiment.

In the failure prediction process illustrated in FIG. 15, in Step 350, the feature amount classification unit 34 classifies the state feature amounts calculated in Step 104 into a state feature amount for a period $\Delta T_2$ and a state feature amount for a period $\Delta T_3$, with reference to the maintenance information extracted in Step 100. Then, the statistical test unit 36 generates the frequency distribution of each of the state feature amounts for the period $\Delta T_2$ and the period $\Delta T_3$ classified by the feature amount classification unit 34 for each of plural types of predetermined state feature amounts corresponding to the type of failure which has occurred in the image forming apparatus to be subjected to the failure prediction process. In addition, the statistical test unit 36 generates the frequency distribution of each of the state feature amounts for the period $\Delta T_2$ and the period $\Delta T_3$ classified by the feature amount classification unit 34 for each of plural types of predetermined state feature amounts corresponding to the failure occurrence position of the image forming apparatus 12 to be subjected to the failure prediction process.

In Step 352, the probability calculation unit 42 acquires a probability distribution for determining a failure occurrence position based on the frequency distributions generated in Step 350 based on the type of state feature amount acquired in Step 124. That is, in Step 352, a frequency distribution corresponding to the type of state feature amount acquired in Step 124 is acquired as the probability distribution for determining a failure occurrence position based on the frequency distributions generated in Step 350.

Then, in Step 354, the probability calculation unit 42 calculates the probability of a failure occurring in the image forming apparatus to be subjected to the failure prediction process in the near future for each type of failure, based on the state feature amounts acquired in Step 124 and the probability distribution for determining the type of failure which is acquired in Step 126, using the Naive Bayes method. In addition, the probability calculation unit 42 calculates the probability of a failure occurring in the image forming apparatus to be subjected to the failure prediction process in the near future for each failure occurrence position, based on the state feature amounts acquired in Step 124 and the probability distribution for determining a failure occurrence position which is acquired in Step 352, using the Naive Bayes method.

In Step 356, the notification unit 26 classifies the probability which has been calculated for each type of failure by the probability calculation unit 42 and the probability which has been calculated for each failure occurrence position by the probability calculation unit 42 according to the type of failure and notifies the probabilities. Then, the failure prediction process ends. When the probabilities for each failure occurrence position are classified according to the type of failure, for example, a correspondence table in which the type of failure and the failure occurrence position are associated with each other may be prepared in advance and the classification may be performed according to the correspondence table.

For example, as illustrated in (c) of FIG. 17, when the process in Step 356 is performed, the probability for each type of failure and the probability for each failure occurrence position are classified according to the type of failure and are notified in the form of a list. In addition, the probability for each type of failure is displayed in descending order and the probability for each failure occurrence position corresponding to each type of failure is displayed in descending order.

Fourth Exemplary Embodiment

In the third exemplary embodiment, the example in which the probability for each type of failure is not corrected has been described. However, in a fourth exemplary embodiment, a case in which probability for a specific type of failure among plural types of failures is corrected will be described. In the fourth exemplary embodiment, the same components as those in the first to third exemplary embodiments are denoted by the same reference numerals and the description thereof will not be repeated.

For example, as illustrated in FIG. 1, a failure prediction system 400 according to the fourth exemplary embodiment differs from the failure prediction system 300 according to the third exemplary embodiment in that it includes a management apparatus 460 instead of the management apparatus 360. In addition, for example, as illustrated in FIG. 5, the management apparatus 460 differs from the management apparatus 360 in that the secondary storage unit 54 stores a failure prediction program 358 instead of the failure prediction program 258.

Next, a failure prediction process according to the fourth exemplary embodiment which is performed by the CPU 50 by the execution of the failure prediction program 358 by the CPU 50 when the start condition of the failure prediction process is satisfied will be described with reference to FIG. 16. The failure prediction process according to the fourth exemplary embodiment differs from the failure prediction process according to the third exemplary embodiment in that it includes Step 456 instead of Step 356 and includes Steps 450, 452, and 454 between Steps 354 and 456. Hereinafter, the steps in which the same processes as those in the steps included in the flowchart illustrated in FIG. 15 are performed are denoted by the same step numbers as those in FIG. 15 and the description thereof will not be repeated.

Figure 16:
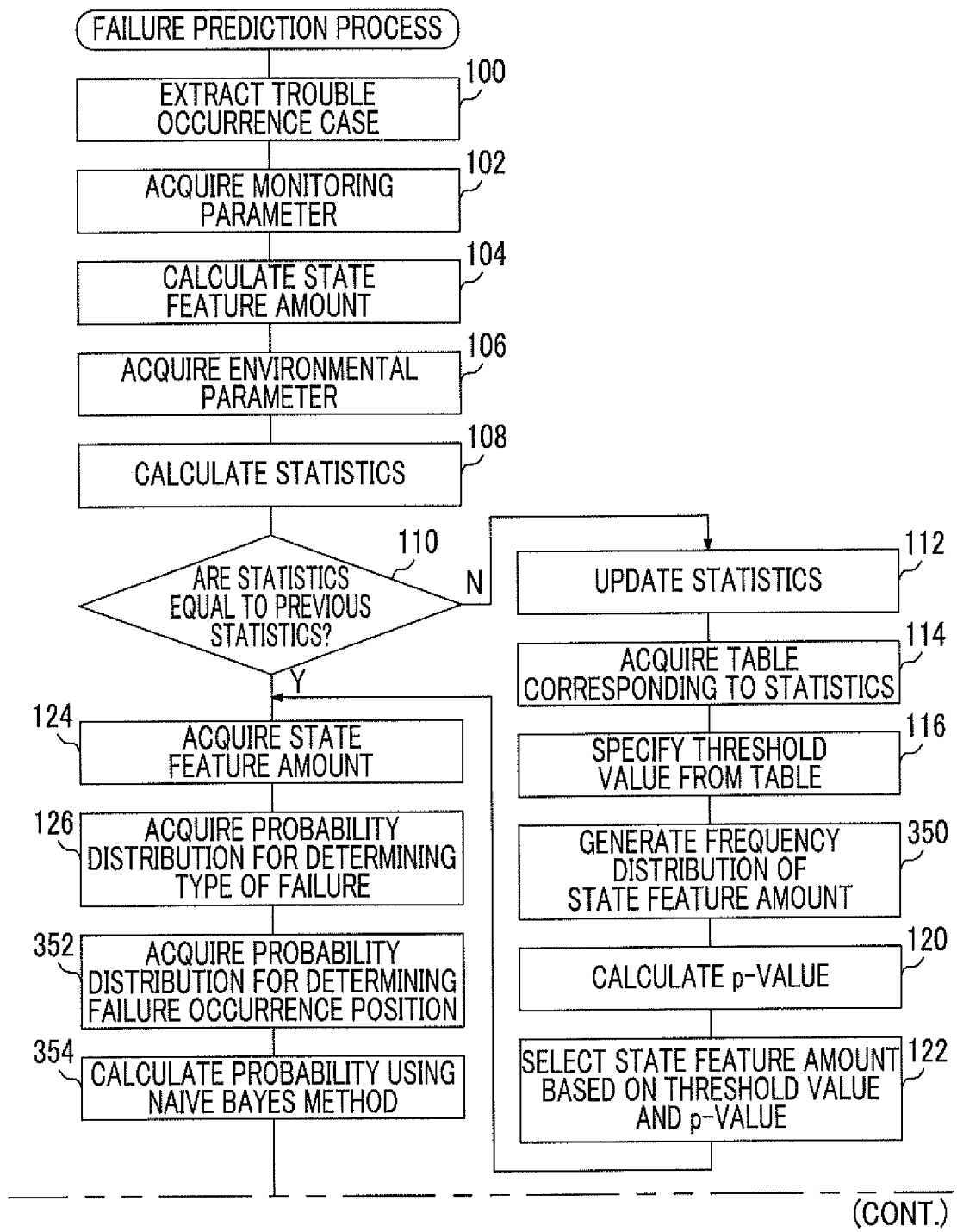
FIG. 16 is a flowchart illustrating an example of the flow of a failure prediction process according to a fourth exemplary embodiment.

In the failure prediction process illustrated in FIG. 16, in Step 450, the probability calculation unit 42 determines whether one probability which has not been a determination target in Step 450 among the probabilities calculated for each failure occurrence position is equal to or greater than a prescribed value. When it is determined in Step 450 that one probability which has not been a determination target in Step 450 among the probabilities calculated for each failure occurrence position is equal to or greater than the prescribed value, that is, when the determination result is "Yes", the process proceeds to Step 452. When it is determined in Step 450 that one probability which has not been a determination target in Step 450 among the probabilities calculated for each failure occurrence position is less than the prescribed value, that is, when the determination result is "No", the process proceeds to Step 454.

In Step 452, the probability calculation unit 42 specifies the type of failure which mainly occurs at the failure occurrence position where probability is equal to or greater than the prescribed value and performs correction for increasing the probability for the specified type of failure by a predetermined percentage. In addition, the type of failure may be specified according to, for example, a correspondence table in which the type of failure and the failure occurrence position are associated with each other in advance.

In Step 454, the probability calculation unit 42 determines whether all of the probabilities calculated for each failure occurrence position have been compared with the prescribed value. When it is determined in Step 454 that all of the probabilities calculated for each failure occurrence position have not been compared with the prescribed value, that is, when the determination result is "No", the process proceeds to Step 450. When it is determined in Step 454 that all of the probabilities calculated for each failure occurrence position have been compared with the prescribed value, that is, when the determination result is "Yes", the process proceeds to Step 456.

In Step 456, the notification unit 26 classifies the probabilities before and after correction which have been calculated for each type of failure by the probability calculation unit 42 and the probabilities which have been calculated for each failure occurrence position by the probability calculation unit 42 according to the type of failure and notifies the probabilities. Then, the failure prediction process ends. When the probabilities for each failure occurrence position are classified according to the type of failure, for example, a correspondence table in which the type of failure and the failure occurrence position are associated with each other may be prepared in advance and the classification may be performed according to the correspondence table.

For example, as illustrated in (d) of FIG. 17, when the process in Step 456 is performed, the probabilities before and after correction which have been calculated for each type of failure and the probabilities which have been calculated for each failure occurrence position are classified according to the type of failure and are notified in the form of a list. In addition, the probability for each type of failure is displayed in descending order of the probability after correction and the probability for each failure occurrence position corresponding to each type of failure is displayed in descending order.

The failure prediction process (FIG. 8 and FIGS. 14 to 16) according to each of the exemplary embodiments is an illustrative example. Therefore, an unnecessary step may be deleted, a new step may be added, or the order of the process may be changed, without departing from the scope and spirit of the invention.

In each of the exemplary embodiments, the example in which the feature amount specifying table has the threshold value has been described. However, the invention is not limited thereto. The feature amount specifying table may have the number of state feature amounts to be selected (an example of ranking specification information according to an exemplary embodiment of the invention), instead of the threshold values. In this case, for example, as illustrated in FIG. 18, the management apparatus 16 includes a ranking unit 37. For example, as illustrated in FIG. 19, the ranking unit 37 ranks the state feature amounts corresponding to the p-value such that the state feature amount with a smaller p-value has a higher ranking. The feature amount selection unit 38 selects the state feature amounts having rankings (high rankings) which are equal to or less than the number of state feature amounts which is specified based on the feature amount specifying table by the feature amount selection condition specifying unit 40. For example, when the number of state feature amounts specified based on the feature amount specifying table is "4", the state feature amounts which are ranked first to fourth are selected.

In each of the exemplary embodiments, the feature amount specifying table has been described as an example. However, the invention is not limited thereto. For example, an arithmetic expression corresponding to the associating information according to an exemplary embodiment of the invention may be used instead of the feature amount specifying table.

In each of the exemplary embodiments, the example in which the state feature amount calculation unit 30 calculates the state feature amount has been described. However, the invention is not limited thereto. For example, the state feature amount acquisition unit 20 may acquire the state feature amount which is calculated by an apparatus other than the management apparatus 16.

In each of the exemplary embodiments, the example in which the statistic calculation unit 32 calculates the statistics has been described. However, the invention is not limited thereto. For example, the statistic acquisition unit 22 may acquire the statistics which are calculated by an apparatus other than the management apparatus 16.

In each of the exemplary embodiments, the example in which the management apparatus 16 includes the state feature amount acquisition unit 20, the statistic acquisition unit 22, and the calculation unit 24 has been described. However, the invention is not limited thereto. For example, the state feature amount acquisition unit 20, the statistic acquisition unit 22, and the calculation unit 24 may be distributed and implemented by plural electronic computers. In addition, any one of plural image forming apparatuses 12 connected to the communication network 18 may include at least one of the state feature amount acquisition unit 20, the statistic acquisition unit 22, and the calculation unit 24.

In each of the exemplary embodiments, the example in which the state feature amounts, the statistics, and the probabilities are calculated by the corresponding arithmetic expressions has been described. However, the invention is not limited thereto. For example, the state feature amounts, the statistics, and the probabilities may be calculated based on a table in which a variable to be substituted into the arithmetic expression is an input and the solution obtained by the arithmetic expression is an output.

In each of the exemplary embodiments, the example in which the feature amount selection condition specifying unit 40 selects the feature amount specifying table corresponding to the temperature standard deviation and the humidity standard deviation has been described. However, the invention is not limited thereto. For example, the feature amount specifying tables may be prepared for each of combinations of the temperature standard deviations L and H, the humidity standard deviations L and H, and atmospheric pressures L and H and the feature amount specifying table corresponding to the temperature standard deviation and the humidity standard deviation calculated by the statistic calculation unit 32 may be selected.

In each of the exemplary embodiments, the example in which one feature amount specifying table is selected among plural feature amount specifying tables by the temperature standard deviation and the humidity standard deviation has been described. However, one feature amount specifying table may be provided. In this case, the selection of the feature amount specifying table by the temperature standard deviation and the humidity standard deviation is not needed.

In each of the exemplary embodiments, the example in which the threshold value is specified based on the feature amount specifying table by the mean temperature value and the mean humidity value has been described. However, the invention is not limited thereto. For example, the threshold value may be specified based on the feature amount specifying table by the temperature standard deviation and the humidity standard deviation. In addition, the threshold value may be specified based on the feature amount specifying table by the variance value of temperature and the variance value of humidity for a specific period, the mode of temperature and the mode of humidity for a specific period, or the median of temperature and the median of humidity for a specific period.

In each of the exemplary embodiments, the image forming apparatus 12 is given as an example of the apparatus to be monitored according to the exemplary embodiment of the invention. However, the invention is not limited thereto. For example, the apparatus to be monitored may be a server apparatus or an automated teller machine (ATM) connected to the communication network 18.

In each of the exemplary embodiments, the example in which the monitoring parameter and the environmental parameter are collected from plural image forming apparatuses 12 has been described. However, the monitoring parameter and the environmental parameter may be collected only from the image forming apparatus to be subjected to the failure prediction process.

In each of the exemplary embodiments, the mean value and the standard deviation are given as examples of the statistics acquired by the statistic acquisition unit 22. However, the invention is not limited thereto. For example, various statistics, such as a variance value, a mode, a median, a maximum value, and a minimum value for a specific period, may be used. In addition, these values may be similarly used as the statistics which are calculated as the state feature amounts.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A failure prediction apparatus comprising:
   a state feature amount acquisition unit that acquires a plurality of state feature amounts indicating features of an operating state of an apparatus to be monitored;
   a statistic acquisition unit that acquires statistics of an environmental physical amount indicating an installation environment of the apparatus to be monitored for a specific period; and
   a calculation unit that acquires a selection condition corresponding to the statistics acquired by the statistic acquisition unit among a plurality of selection conditions, and calculates probability of a failure occurring in the apparatus to be monitored, using the state feature amount satisfying the acquired selection condition,
   wherein the plurality of selection conditions are predetermined for each category of the statistics, and are conditions for selecting each of the state feature amounts required to calculate the probability of the failure occurring in the apparatus to be monitored, such that
   a frequency distribution of each of the plurality of the state feature amounts, which include at least one of a charged voltage, a developing bias, and amount of laser light, is generated for a normal period and an abnormal period, and the frequency distribution is used to calculate a p-value for each state feature amount, and the p-values of the state feature amounts are compared with the plurality of selection conditions in order to select the state feature amount used to calculate the probability of the failure among the plurality of state feature amounts, and the probability of failure among the plurality of state feature amounts is transmitted to a terminal to display a final maintenance schedule.

2. The failure prediction apparatus according to claim 1, wherein the statistics are classified into a category of a first statistic and a category of a second statistic, the statistic acquisition unit acquires the first statistic and the second statistic, each of the plurality of selection conditions is predetermined for each category of the first statistic and each category of the second statistic, and the calculation unit calculates the probability, using the state feature amount which satisfies the selection condition corresponding to the first statistic and the second statistic acquired by the statistic acquisition unit among the plurality of selection conditions.

3. The failure prediction apparatus according to claim 2, wherein associating information in which the category of the first statistic and the selection condition are associated with each other is classified for each category of the second statistic, and the calculation unit acquires the associating information based on the second statistic acquired by the statistic acquisition unit, acquires the selection condition corresponding to the first statistic acquired by the statistic acquisition unit based on the associating information, and calculates the probability using the state feature amount which satisfies the acquired selection condition.

4. The failure prediction apparatus according to claim 2, wherein the first statistic is a mean value of the environmental physical amount for the specific period, and the second statistic is a standard deviation of the environmental physical amount for the specific period.

5. The failure prediction apparatus according to claim 3, wherein the first statistic is a mean value of the environmental physical amount for the specific period, and the second statistic is a standard deviation of the environmental physical amount for the specific period.

6. The failure prediction apparatus according to claim 1, wherein the environmental physical amount is temperature and humidity.

7. The failure prediction apparatus according to claim 2, wherein the environmental physical amount is temperature and humidity.

8. The failure prediction apparatus according to claim 1, wherein the plurality of the state feature amounts are unique to functions of the apparatus to be monitored.

9. The failure prediction apparatus according to claim 2, wherein the plurality of the state feature amounts are unique to functions of the apparatus to be monitored.

10. The failure prediction apparatus according to claim 1, wherein the plurality of selection conditions are a plurality of threshold values, and the calculation unit calculates the probability using the state feature amount corresponding to the p-value which is less than the threshold value corresponding to the statistics acquired by the statistic acquisition unit.

11. The failure prediction apparatus according to claim 2, wherein the plurality of selection conditions are a plurality of threshold values, and the calculation unit calculates the probability using the state feature amount corresponding to the p-value which is less than the threshold value corresponding to the statistics acquired by the statistic acquisition unit.

12. The failure prediction apparatus according to claim 1, wherein the plurality of selection conditions are a plurality of ranking specification information for specifying each ranking, and the calculation unit ranks the state feature amounts such that the state feature amount with a smaller p-value has a higher ranking, and calculates the probability, using the state feature amount having a ranking equal to or higher than a ranking specified by the ranking specification information corresponding to the statistics acquired by the statistic acquisition unit.

13. The failure prediction apparatus according to claim 1, wherein the calculation unit calculates the probability, using a distribution when a failure occurs, which indicates an occurrence frequency distribution of the state feature amount when a failure occurs in the apparatus to be monitored, and a distribution when no failure occurs, which indicates an occurrence frequency distribution of the state feature amount when no failure occurs in the apparatus to be monitored.

14. The failure prediction apparatus according to claim 1, wherein the calculation unit selects the selection condition corresponding to the statistics acquired by the statistic acquisition unit among the plurality of selection conditions on condition that the statistics acquired by the statistic acquisition unit are changed, and calculates the probability, using the state feature amount satisfying the selected selection condition.

15. A failure prediction system comprising:

the failure prediction apparatus according to claim 1; and an apparatus to be monitored of which state feature amount is acquired by a state feature amount acquisition unit in the failure prediction apparatus.

16. The failure prediction system according to claim 15, wherein the apparatus to be monitored is an image forming apparatus that forms an image.

* * * * *